(12) United States Patent
Chong, Jr.

(10) Patent No.: US 7,111,137 B2
(45) Date of Patent: Sep. 19, 2006

(54) DATA STORAGE SYSTEMS AND PROCESSES, SUCH AS ONE-WAY DATA MIRROR USING WRITE MIRRORING

(75) Inventor: Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 407 days.

(21) Appl. No.: 10/748,586

(22) Filed: Dec. 29, 2003

(65) Prior Publication Data

US 2005/0144406 A1 Jun. 30, 2005

(51) Int. Cl.
G06F 12/16 (2006.01)

(52) U.S. Cl. .................... 711/162; 711/161
(58) Field of Classification Search ........... 711/161, 711/162
See application file for complete search history.

(56) References Cited

U.S. PATENT DOCUMENTS

| | | | |
|---|---|---|---|
| 6,317,815 B1 * | 11/2001 | Mayer et al. ............ 711/165 |
| 6,618,794 B1 * | 9/2003 | Sicola et al. ............ 711/154 |
| 6,883,074 B1 * | 4/2005 | Lee et al. ............... 711/162 |
| 6,938,137 B1 * | 8/2005 | Fujibayashi et al. ...... 711/162 |
| 6,957,221 B1 * | 10/2005 | Hart et al. ............. 707/100 |
| 2003/0115432 A1 * | 6/2003 | Biessener et al. ........ 711/162 |
| 2003/0140204 A1 * | 7/2003 | Ashton et al. ........... 711/162 |
| 2003/0149736 A1 * | 8/2003 | Berkowitz et al. ........ 709/213 |

* cited by examiner

*Primary Examiner*—Woo H. Choi
(74) *Attorney, Agent, or Firm*—Blakely Sokoloff Taylor & Zafman LLP

(57) ABSTRACT

Methods and systems for data storage are described herein. In one aspect of the invention, an exemplary process includes receiving a first data being directed to a first storage volume, receiving a second data being directed to a second storage volume, writing the first data, as part of a first I/O (input/output) process which begins before a selected time, to a first storage image and a second storage image, the first storage image and the second storage image forming a data mirror prior to the selected time, wherein writes to one image are replicated to the other image, and writing the second data, as part of a second I/O process which begins after the selected time, to the second storage image but not to the first storage image, the second I/O process being capable of running while the first process runs. Other methods and apparatuses are also described.

34 Claims, 33 Drawing Sheets

DATA STORAGE SYSTEMS AND PROCESSES, SUCH AS ONE-WAY DATA MIRROR USING WRITE MIRRORING

FIELD OF THE INVENTION

This invention relates generally to operations of a data storage system, such as a backup or recovery of a data storage system.

BACKGROUND

The use of information technology (e.g., computer systems, etc.) has increased rapidly, and this use has required the storage of large amounts of data, usually in the form of digital data. This digital data includes bank records, Web sites with millions of Web pages, music, and motion pictures, etc. It is often necessary to be able to get access to the data at any time of the data; in other words, it is often necessary that the data be available 24 hours/day, 7 days a week. Further it is often necessary that the data be safeguarded from loss of the data, and thus, backup systems, which keep a backup or archival copy of the data in a safe medium (e.g., optical storage or tape storage), are often used to maintain and preserve the data in case the primary storage device (e.g., hard drives) fail. These requirements (e.g., the storage of large amounts of data which must be available at any time of the data and which must be safe guarded from loss) present difficult challenges for data storage systems which must attempt to safeguard the data (e.g., by archiving backup copies) without disrupting the desire for users to get access. Thus, it is desirable that backup operations, which make backup copies, be performed with minimal disruption to the users. Further, the backup operations should normally be done in a way that leaves the state of the captured data consistent with any ongoing storage processes. This means that all transactions and updates must be completed before the data is captured for the backup.

An example of a transaction is withdrawing money from a bank savings account. If this is performed by a user at an ATM, the account must be identified and the account holder must be verified. The amount of the withdrawal is entered and transaction information is sent to the account database. The withdrawal date, time, and amount information must be recorded and the current balance must be updated. These actions are part of the transaction. The associated data is in a consistent state if the exemplary transaction has been entirely completed or before the transaction has started processing. This means that the savings account information must reflect the new balance and record the withdrawal or not record the withdrawal and reflect the old balance. An example of an inconsistent state would be recording the withdrawal but not updating the new balance.

SUMMARY OF THE DESCRIPTION

Methods and systems for data storage are described herein. In one aspect of the invention, an exemplary process includes receiving a first data being directed to a first storage volume, receiving a second data being directed to a second storage volume, writing the first data, as part of a first I/O (input/output) process which begins before a selected time, to a first storage image and a second storage image, the first storage image and the second storage image forming a data mirror prior to the selected time, wherein writes to one image are replicated to the other image, and writing the second data, as part of a second I/O process which begins after the selected time, to the second storage image but not to the first storage image, the second I/O process being capable of running while the first process runs.

The present invention also includes systems which perform these methods and machine-readable media which, when executed on a data processing system, cause a system to perform these methods. Other features of the present invention will be apparent from the accompanying drawings and from the detailed description which follows.

BRIEF DESCRIPTION OF THE DRAWINGS

The present invention is illustrated by way of example and not limited in the figures of the accompanying drawings in which like references indicate similar elements.

DETAILED DESCRIPTION

Figure 1A:
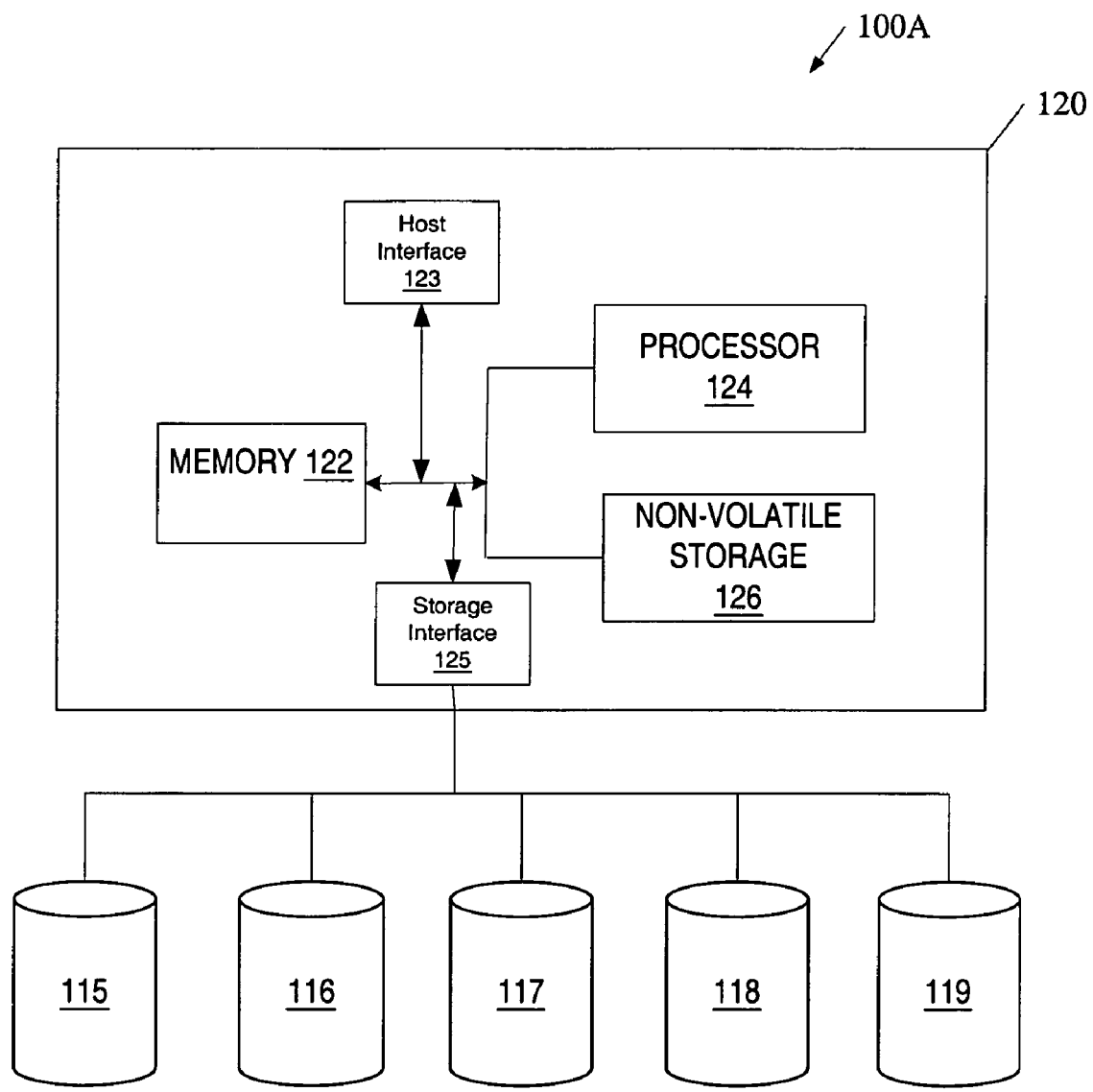
FIG. 1A shows a block diagram illustrating an exemplary system which may be used with an aspect of the invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of this description are presented in terms of algorithms and symbolic representations of operations on data bits within a processing system, such as a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing or computing device, that manipulates and transforms data represented as physical (e.g. electronic or optical) quantities within the computer system's registers and memories into other data similarly represented as physical quantities within the computer system memories or registers or other such information storage, transmission or display devices.

The present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Alternatively, the computer program may be received from a network interface (e.g. an Ethernet interface) and stored and then executed from the storage or executed as it is received.

The algorithms and displays presented herein are not inherently related to any particular computer or other data processing apparatus. Various general-purpose systems may be used with programs in accordance with the teachings herein, or it may prove convenient to construct a more specialized apparatus to perform the methods. In addition, the present invention is not described with reference to any particular programming language. It will be appreciated that a variety of programming languages may be used to implement the teachings of the invention as described herein. Furthermore, aspects of the invention may be implemented in hardware entirely (without the use of software).

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other forms of propagated signals (e.g., carrier waves, infrared signals, digital signals, etc. which provide the computer program instructions).

Figure 3A:
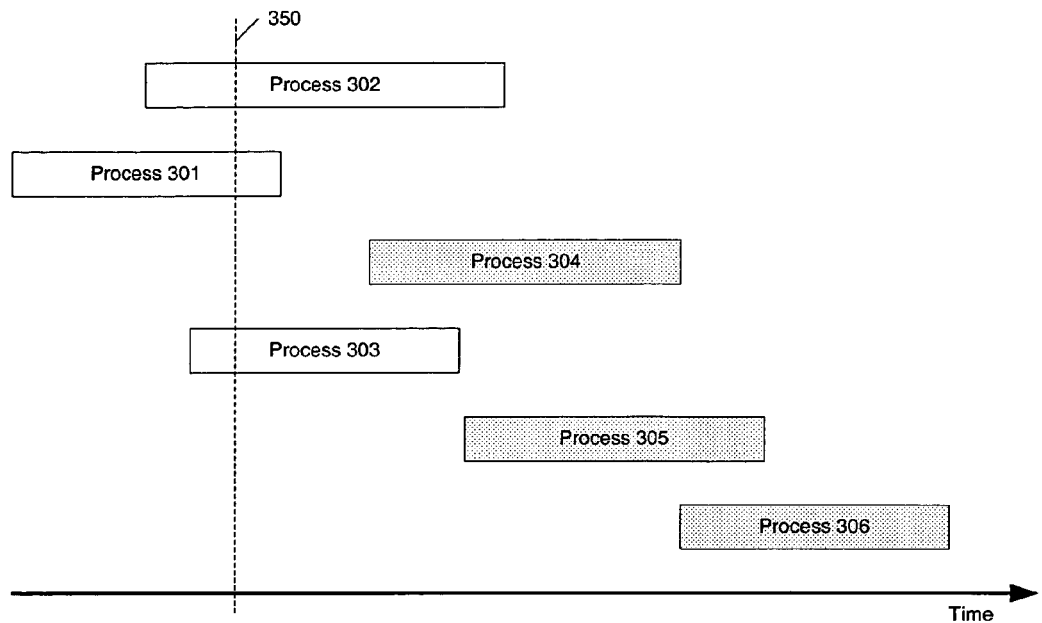
FIG. 3A shows a timing diagram of a variety of processes, starting and ending at various times, which may be used with an embodiment of the invention.
Figure 3B:
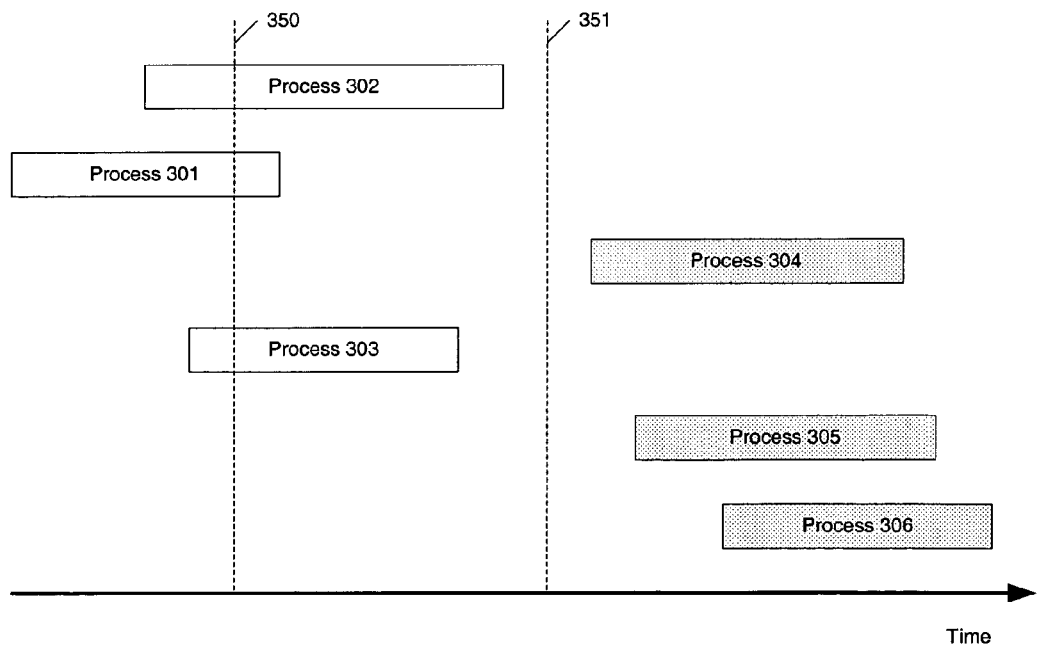
FIG. 3B shows a timing diagram of a conventional backup process of the prior art.

To obtain a backup that is in a consistent state, a conventional approach is to quiesce the read/write activities by allowing current transactions to complete, while preventing any new transactions from starting before the backup copy is taken. As a result, this approach causes a disruption in service as some users are delayed. For example, as shown in FIG. 3A, six transactions start and end at various times. In this example, processes 301–303 are currently executing and processes 304–306 are new processes scheduled to be executed at different times. In order to perform a backup operation on a storage volume where the processes 301–303 are executing, a conventional approach would delay the backup operation until the current processes 301–303 are completed. The backup operation can consist of a point-in-time copy used to create a shadow image, which may be subsequently copied to another storage media such as a storage tape. In the mean time, the system has to prevent any new processes (e.g., processes 304–306) from starting, until the backup operation is completed. Once the current processes 301–303 finish while the new processes 304–306 are pending execution, the system performs the point-in-time copy of the backup operation. After the data in the storage volume has been used to create the point-in-time copy, the system then allows processes 304–306 to be executed. As a result, the services during the backup operation are disrupted because processes 304–306 are delayed by waiting for transactions to complete and the point-in-time copy, which are illustrated in FIG. 3B. Alternatively, the backup operation could be delayed. Therefore, a better solution is desirable to present consistent data for the backup, as well as to reduce or eliminate the amount of time data is unavailable.

Embodiments of the invention provide consistent data backup (e.g., no transaction or updates outstanding) while allowing storage processes to run without interruption, thus providing full storage services. An exemplary operation is as follows. Assuming VLUN A has the data for all the processes. Data is read and updated on VLUN A prior to the time 350 when a consistent backup snapshot is requested. At time 350, a second volume, VLUN B is created which is an exact copy of VLUN A. All current processes and their associated transaction data updates are applied to VLUN A and VLUN B. All processes which start after time 350 use only VLUN B. When the processes which were active at time 350 complete, VLUN A is a consistent copy of the data. VLUN A can then be copied to another media, such as a tape, for archiving. After the archived copy has been completed, VLUN A can be discarded. VLUN B continues to be the volume which has the most current data for the processes. The mechanism which manages VLUN A and VLUN B is called a one-way mirror device.

FIG. 3A shows a plurality of read or write transactions 301–306 beginning and ending at various times as shown in FIG. 3A. It would be appreciated that the invention is not limited to a fixed number of transactions. Each of these transactions may be one of a write or a read transaction to a storage device. In one embodiment, these transactions may be executed by a data processing system such as data processing system 200 of FIG. 2. Alternatively, these transactions may be executed through multiple processors of a data processing system. Furthermore, these transactions may be executed by multiple data processing systems substantially simultaneously (e.g. several computer systems, coupled through a network to a data storage system such as the system shown in FIG. 1A, are each involved in a read or write transaction with storage devices in the array controlled by controller 120). These transactions may access a single volume of a storage media, or alternatively, these transactions may access multiple volumes of a storage media.

FIG. 3B shows a timing diagram illustrating a typical backup process in the prior art. Referring to FIG. 3B, a backup operation includes a quick volume copy, such as a point-in-time copy (which may also be called a snapshot), and writing the redundant shadow volume to another storage media such as a tape. At the time when a backup request is received at time 350, transactions 301–303 are being executed while transactions 304–306 are pending execution (transactions 304–306 have not been started). A conventional method is to delay the point-in-time copy operation and the executions of the pending transactions 304–306, until the current transactions 301–303 are finished. This delay can be seen by comparing FIG. 3A to FIG. 3B. When the current transactions (e.g., transactions 301–303) are completed at time 351, a point-in-time copy is taken. After the point-in-time copy has been taken, the new transactions (e.g., transactions 303–306) are allowed to start. This delay, while acceptable in some cases, is undesirable.

Figure 3C:
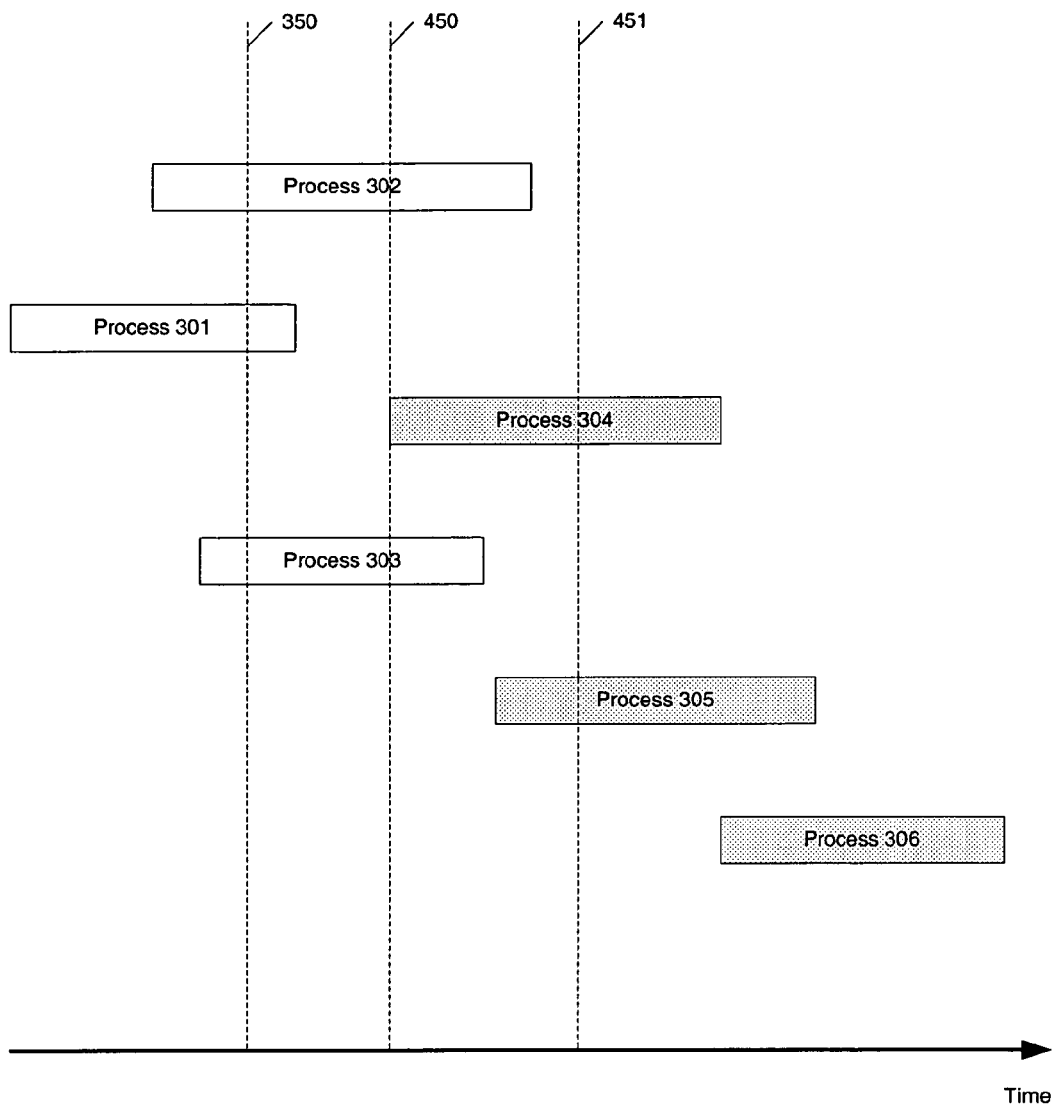
FIG. 3C shows a timing diagram of a backup operation in accordance with an aspect of the invention.

FIG. 3C shows a timing diagram illustrating an exemplary backup process in accordance with one aspect of the invention. Referring to FIG. 3C, according to one embodiment of the invention, prior to time 350, all input/output (I/O) transactions use a virtual logical unit number (VLUN) A which may be referred to as a virtual logical volume A. At time 350 the one-way mirror device creates VLUN B, which may be referred to as a virtual logical volume B. There is a relatively short period of time (e.g., between time 350 and 450) required to set up VLUN B. Assuming at time 450, the VLUN B has been created, all transactions active at the time 350 (e.g., transactions 301–303) continue to use VLUN A. However, any transactions starting after time 450 (e.g., transactions 304–306) use only VLUN B. After the transactions which were active at time 350 complete, at time 451, VLUN A can be taken offline to perform backup operations (e.g., VLUN A can be written to a tape, etc.). As a result, VLUN A is a consistent snapshot of the database or files stored on VLUN A with no transaction or updates outstanding. After time 451, all transactions access VLUN B (for either reads or writes). In addition, in this embodiment, all writes to VLUN A (e.g., the original volume) are also applied to VLUN B. However, writes to VLUN B are not applied to VLUN A. This is equivalent to mirrored volumes with the writes flowing in one direction only (e.g., VLUN A to VLUN B). As a result, VLUN B has all the data from both the transactions which started before and after time 350. VLUN A has only the data associated with transactions which started before time 350. After time 451, VLUN B may be copied to another volume, VLUN B', to eliminate any dependencies on physical storage common to VLUN A and VLUN B.

The one-way mirror may create VLUN B from VLUN A using a point-in-time copy or snapshot method such as StorEdge Instant Image system from Sun Microsystems. Other methods may alternatively be utilized. The three methods of implementing the one-way mirror are copy-on-write, write logging, and mirroring. Embodiments of these methods would be discussed in detail further below.

Figure 4:
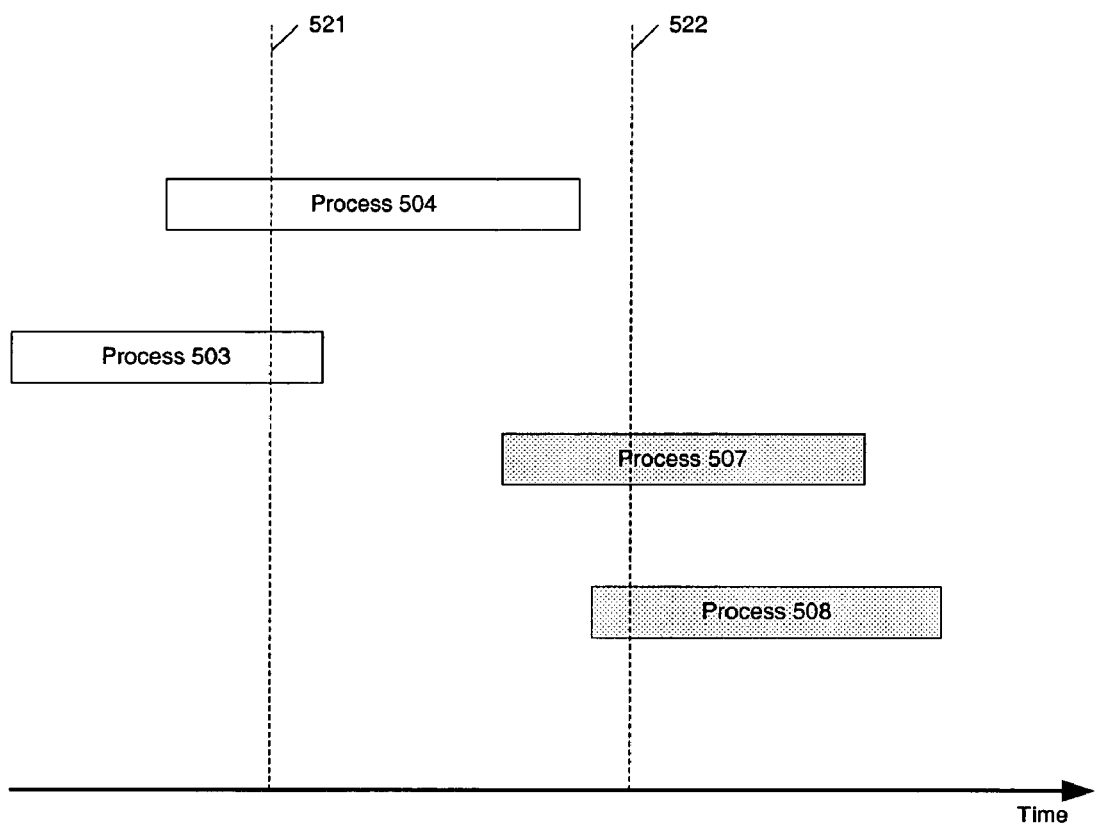
FIG. 4 shows a timing diagram of a backup operation in accordance with an aspect of the invention.

FIG. 4 shows a timing diagram and 5A–5D show block diagrams of an exemplary backup process in accordance with an aspect of the invention. Note that if there is only one process, then obtaining a consistent data backup is trivial, just wait for the process to complete the current transaction and perform the backup. The environment of typical embodiments of the invention address two or more processes operating on a common database. Referring to FIGS. 4 and 5A–5D, the system 500 includes transaction sources 501, a transaction request queue 502, a lock mechanism 505, and a storage media such as VLUN A 506. The transactions may originate from multiple sources (e.g. different client processing systems over a network or different applications on the same processing system), and the transactions are temporarily held in one or more queues, such as transaction queue 502, from which they are dispatched for execution (e.g. a read or a write operation to a storage device). In this embodiment, prior to time 521, processes 503 and 504 process transactions from the queue 502. Prior to time 521, both processes 503 and 504 use VLUN A. Process 503 may be a read or a write transaction to VLUN A and process 504 may be a read or a write transaction to VLUN A. At time 521, a snapshot of VLUN A is taken by the one-way mirror device or mechanism. The snapshot of VLUN A is used to create VLUN B (see, FIG. 5B). These read or write transactions to VLUN A or to VLUN B may be implemented using known storage virtualization techniques.

Figure 5A:
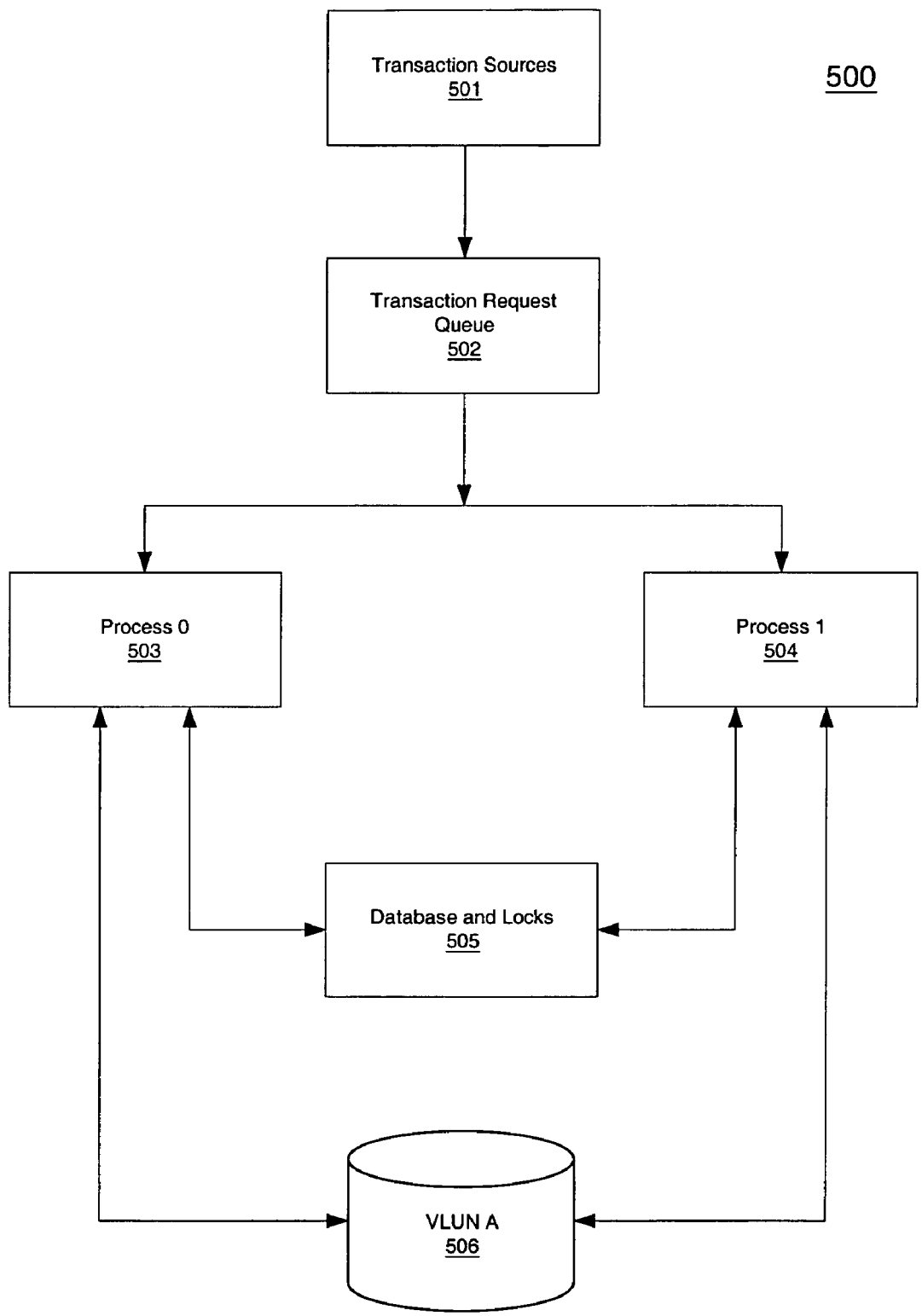
FIGS. 5A–5D show a block diagram of a backup operation in accordance with another aspect of the invention.
Figure 5B:
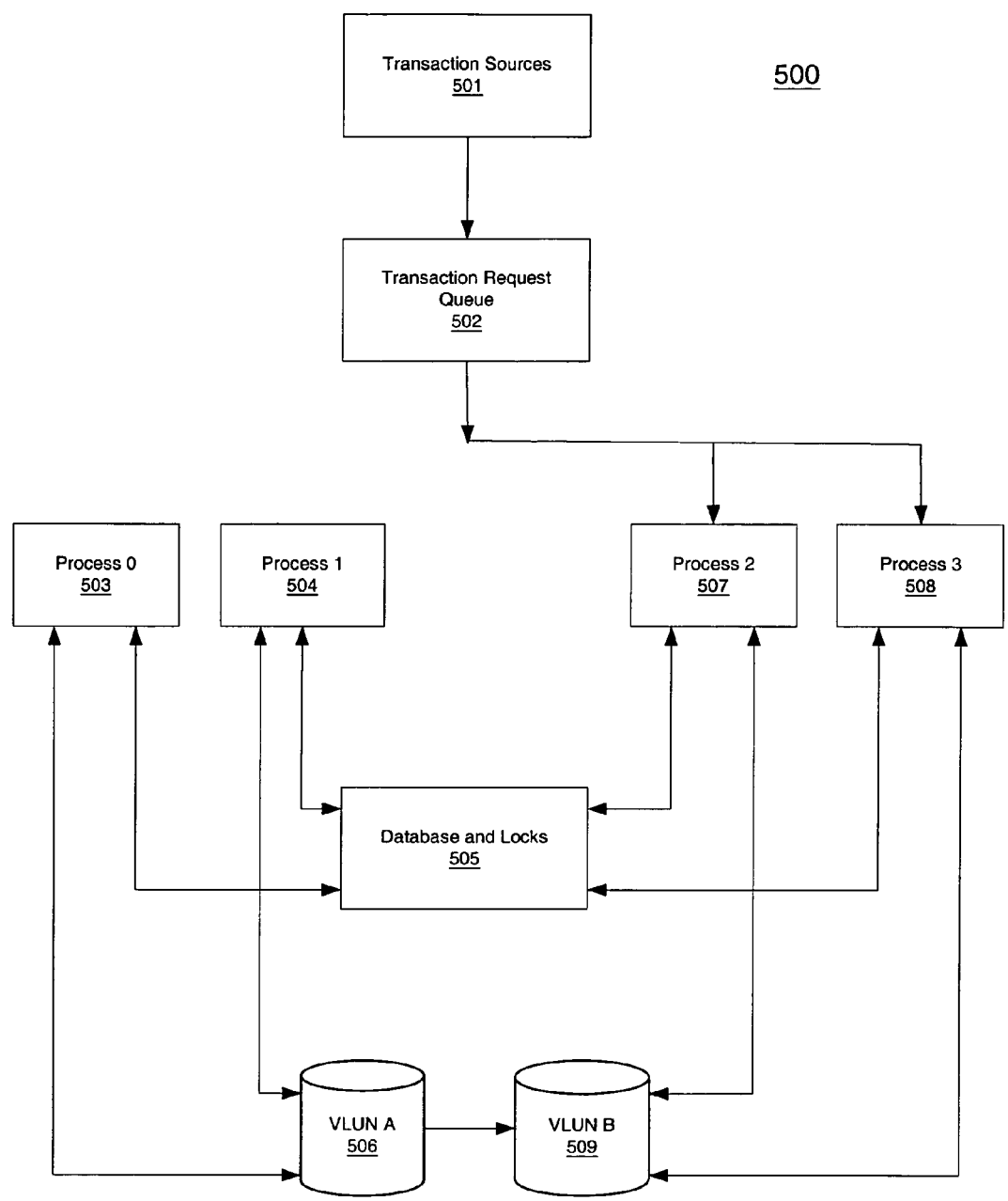

In addition, two new processes, such as processes 507 and 508 of FIG. 5B are started. The system then routes all new transactions to processes 507 and 508. Meanwhile, processes 503 and 504 are allowed to complete the transactions that were active at the time 521. No new transactions are provided to processes 503 and 504. Processes 503 and 504 utilize only VLUN A, thus, VLUN A only contains changes for transactions which started before time 521. In addition, writes made to VLUN A also go to VLUN B. Similar to an ordinary mirror write, the acknowledgement back to the process is not sent until both VLUN A and VLUN B acknowledge the writes. Processes 507 and 508 utilize VLUN B. However, writes made to VLUN B from the processes 507 and 508 are not written to VLUN A. As a result, VLUN B receives updates from all the processes and thus, accurately represents the current databases. In one embodiment, the database and other locks 505 are external to VLUN A and VLUN B to prevent any inconsistent or corrupted data. These locks ensure that data being written and read by those processes before time 521 and after time 521 do not interfere with one another.

Figure 5C:
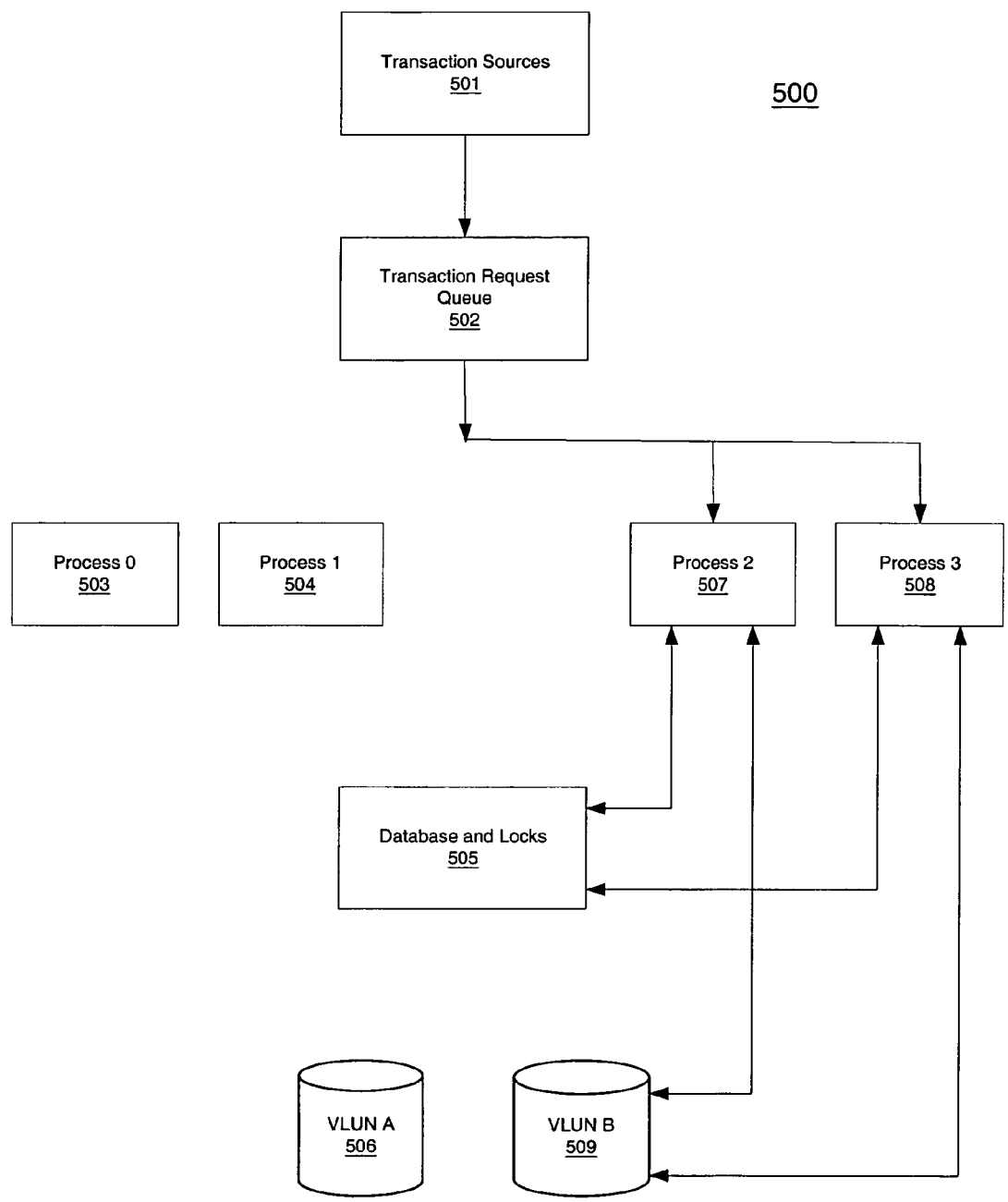
Figure 5D:
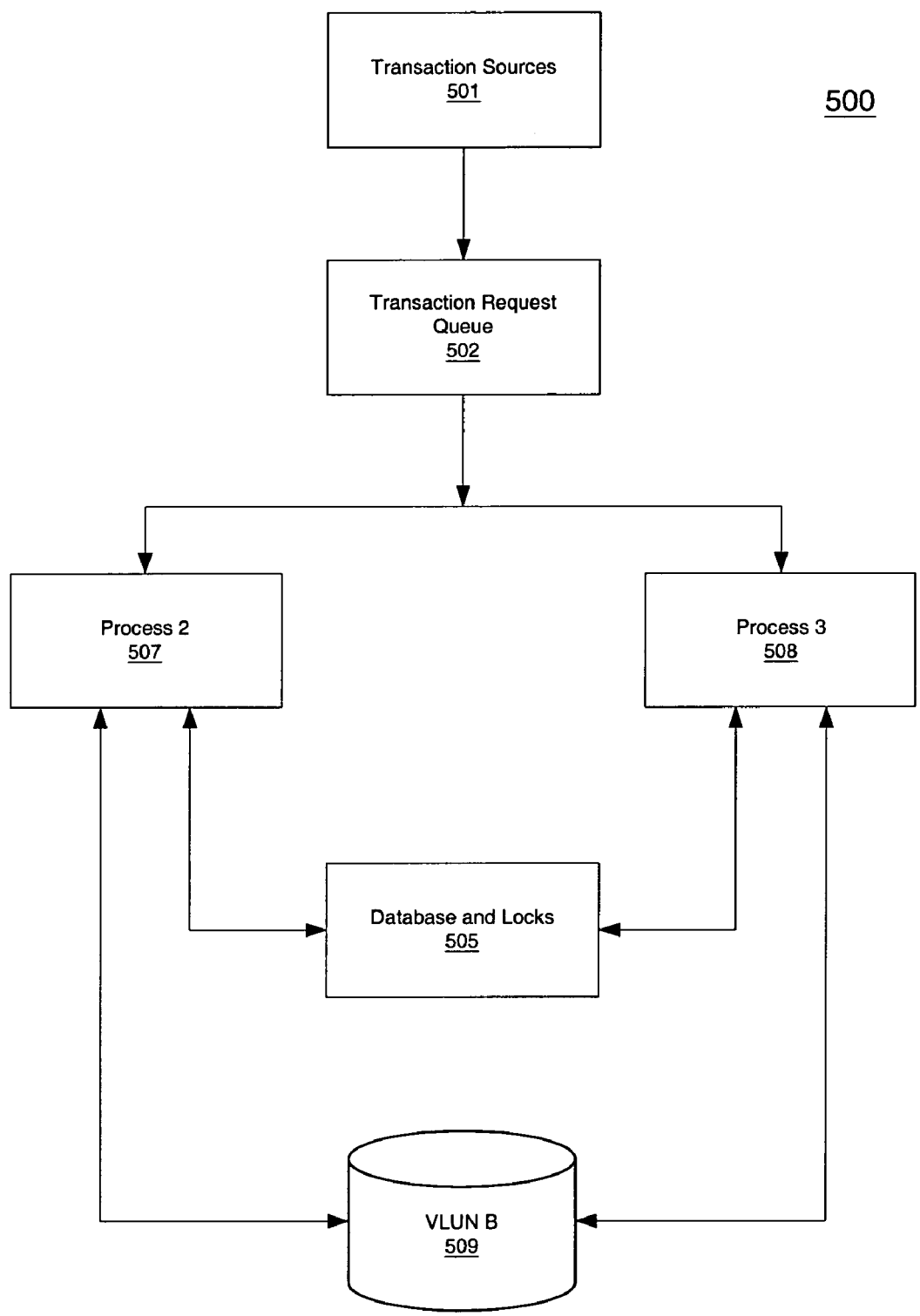

At time 522, referring to FIGS. 4 and 5C, when processes 503 and 504 are completed, VLUN A is in a consistent state and a backup operations can be performed on VLUN A. Meanwhile, processes 507 and 508 continue on VLUN B, as shown in FIGS. 5C and 5D.

It is important to know that the locks associated with the data to be backed up are desirable to the implementation of embodiments of the invention. The processes access common data (e.g. VLUN A) but use locks to control access and updating. Note that the locks are not part of the database and will not be backed up (normally). Common data areas which may be updated by any of the active processes should be protected by locks. According to one embodiment, there are two categories of common data to be protected: a) data specific to a transaction, and b) data not associated with a specific transaction. With respect to type a), the application's existing locks may be sufficient. The locks may be acquired before the transaction starts and may be released when the transaction completes. An example of such locks may be used in updating information of a bank account. The bank account information (e.g., bank account balance) is locked until a deposit transaction is completed. Thus the lock mechanism prevents two transactions from updating the same bank account simultaneously. However, for type b), additional locks may be required. The locks may be acquired at or before time 521, and be released at time 522, to prevent any transaction starting after time 521 from updating these data areas. If the system is a RAID-5 compatible storage system, a stripe lock may be required. Other lock mechanisms may be used by a person of ordinary skill in the art.

According to an aspect of the invention, the lock mechanism (e.g., locks 505) is maintained separately from the databases to be backed up. The lock mechanism is not included in the backup operations and the backup operations do not back up the locks.

According to yet another aspect of the invention, VLUN A may be a traditional mirrored volume. At time 350 of FIG. 4, the mirror is split with one copy becoming an equivalent of VLUN A and the other copy of VLUN B. In one embodiment, when more redundancy is required, more than two one-way mirror operations may be implemented.

Figure 6:
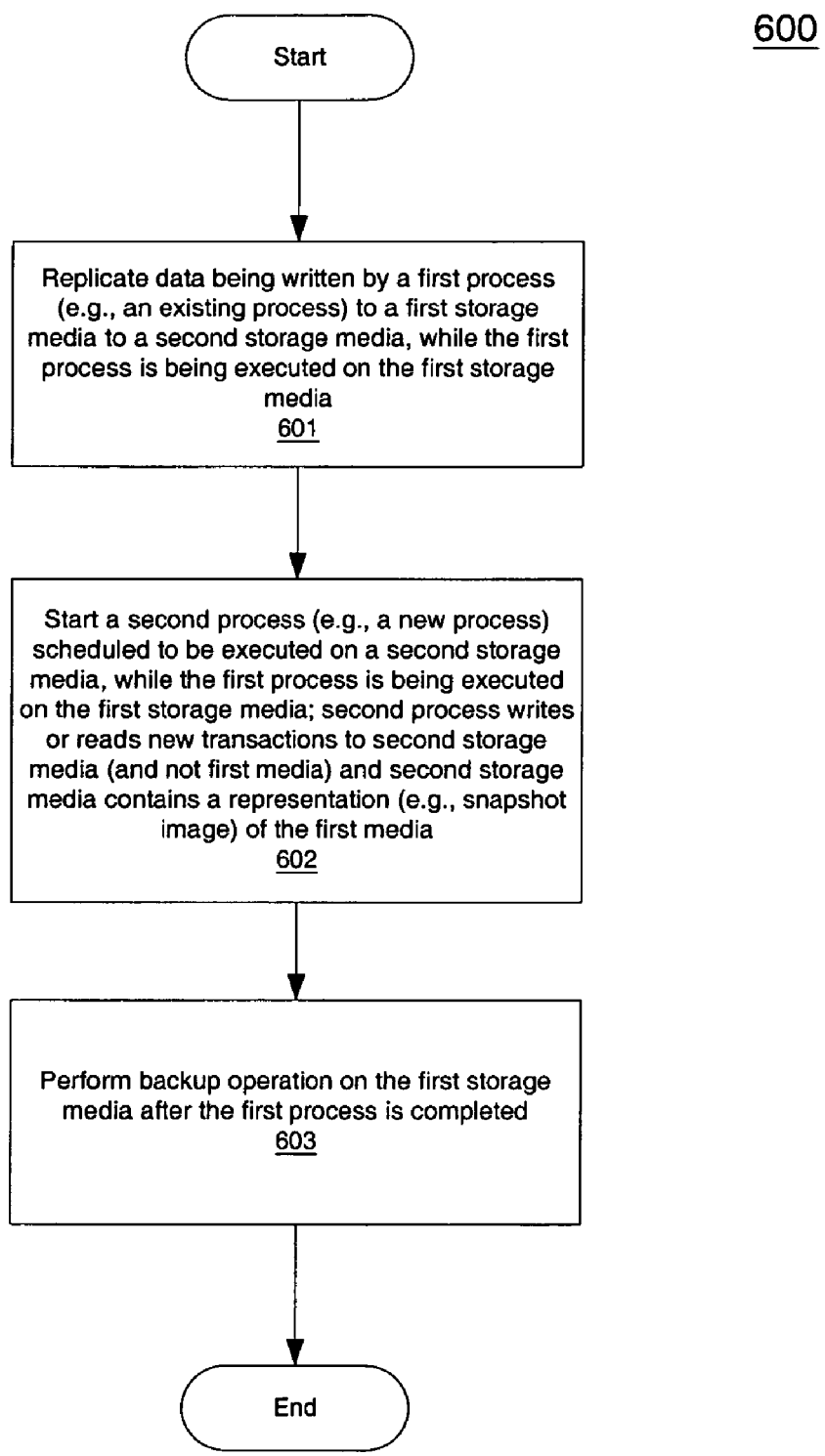
FIG. 6 shows a flowchart illustrating a backup process in accordance with an aspect of the invention.

FIG. 6 shows a flowchart illustrating an exemplary backup process in accordance with an aspect of the invention. In one embodiment, the process 600 includes replicating data being written to a first storage volume by a first process to a second storage volume, while the first process is being executed on the first storage volume; executing a second process scheduled to be executed on the second storage volume, while the first process is being executed on the first storage volume, and performing a backup operation on the first storage volume after the first process is completed. In one embodiment, the exemplary method further includes obtaining a point-in-time copy of data stored on the first storage volume and copying the point-in-time copy of the data to the second storage volume.

Referring to FIG. 6, at block 601, at time 350, the system replicates data being written by a first process, such as existing processes 301–303 of FIG. 3C, from a storage volume (e.g., VLUN A) to a second storage volume (e.g., VLUN B), while the first process is being executed on the first storage volume. In one embodiment, a point-in-time copy or a snapshot of the first storage media is taken before the replication. At block 602, a second process (e.g., a new process or a pending process, such as processes 304–306 of FIG. 3C) scheduled to be executed is launched at the second storage volume, while the first process is being executed on the first storage volume. As a result, the first process continues to write to the first storage volume and the replication writes the same data to the second storage volume, while the second process writes data to the second storage volume only. When the first process is completed, at block 603, a backup operation is performed on the first storage volume.

In one embodiment, in order to protect the storage location being replicated and to prevent more than one process access to the same area, a lock mechanism is provided. The lock mechanism may be a conventional lock mechanism used in the art. In one embodiment, if the storage system is a RAID compatible system, such as RAID-5 system, a stripe lock may be utilized. Other lock mechanisms may be apparent to an ordinary person skilled in the art for different configurations. Before the replication starts, the lock mechanism may be used to prevent other processes from accessing the same area being replicated. Once the lock is acquired, the system replicates the first storage volume and releases the lock once the replication is complete. In one embodiment, the lock mechanism is maintained independent of the first and second storage volumes and is not a part of the backup operation.

Figure 7:
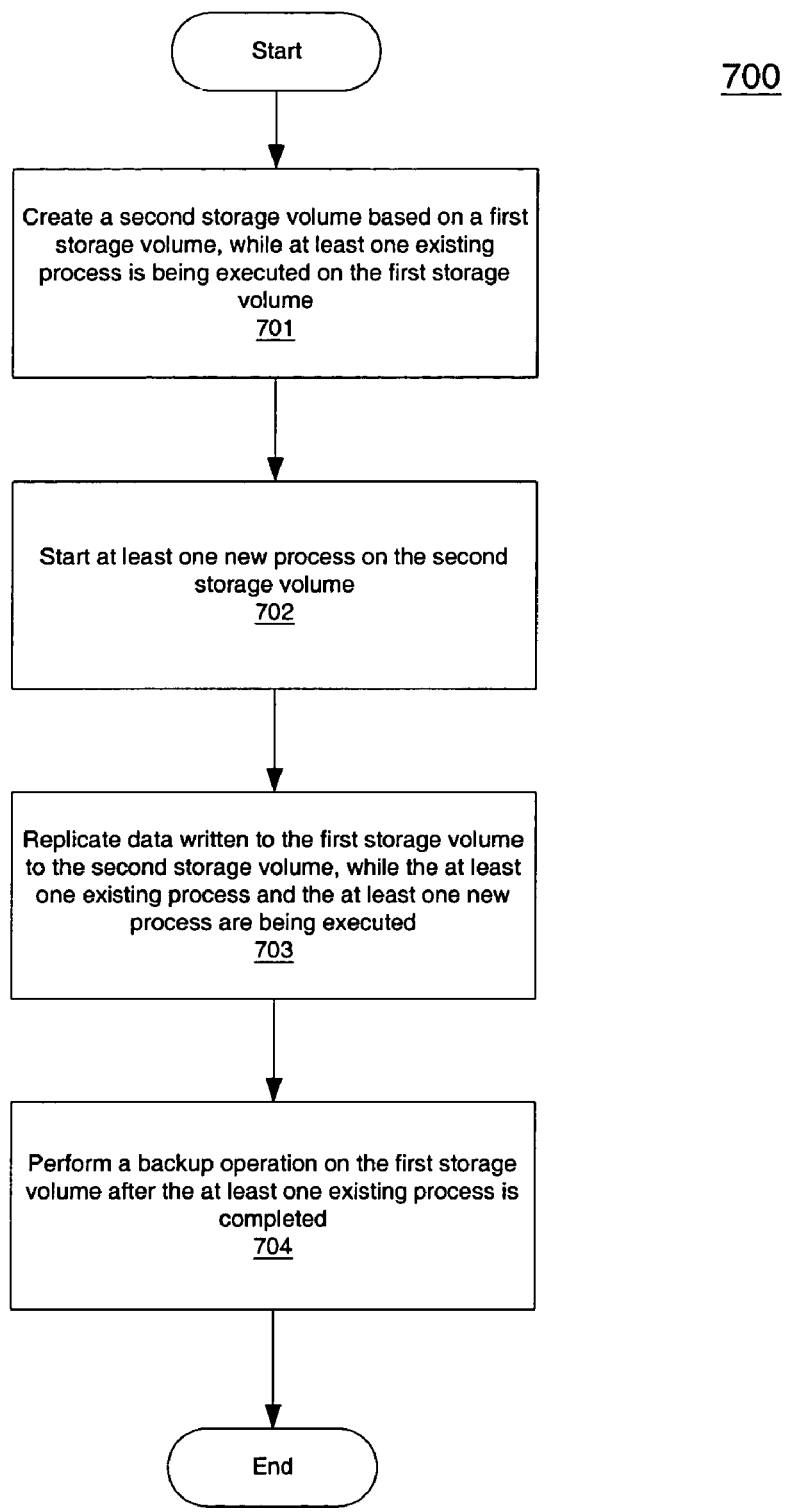
FIG. 7 shows a flowchart illustrating a backup process in accordance with another aspect of the invention.

FIG. 7 shows a flowchart illustrating an exemplary process in accordance with an aspect of the invention. In one embodiment, the process 700 includes creating a second storage volume based on a first storage volume while at least one existing process is being executed on a first storage volume, executing at least one new process to the second storage volume, replicating data written to the first storage volume to the second storage volume (this replication may be substantially simultaneous with the at least one existing process which is being executed on the first storage volume), while the at least one existing process and the at least one new process is being executed, and performing a backup operation on the first storage volume after the at least one existing process is completed.

Referring to FIG. 7, at time 350, after a point-in-time copy or a snapshot of a first storage volume such as VLUN A is taken, at block 701, the snapshot of the first storage volume becomes a second storage volume. The snapshot may contain data written by the at least one existing process being executed on the first storage volume. After the second storage volume is created, at block 702, the system then starts at least one new process on the second volume. At block 703, the system replicates data written to the first storage volume to the second storage volume, while the at least one existing process and the at least one new process are being executed on the first and the second storage volumes respectively (the replication of data written to the first storage volume to the second storage volume may be substantially simultaneous). When the at least one existing process is completed on the first storage volume, at block 704, the first storage volume may be taken offline and a backup operation may be performed on the first storage volume. In one embodiment, the second storage volume may be created using a mirrored image of the first storage volume through a mirror splitting operation. Alternatively, the second storage volume may be created through a copy-on-write or a write-logging operation.

Figure 8:
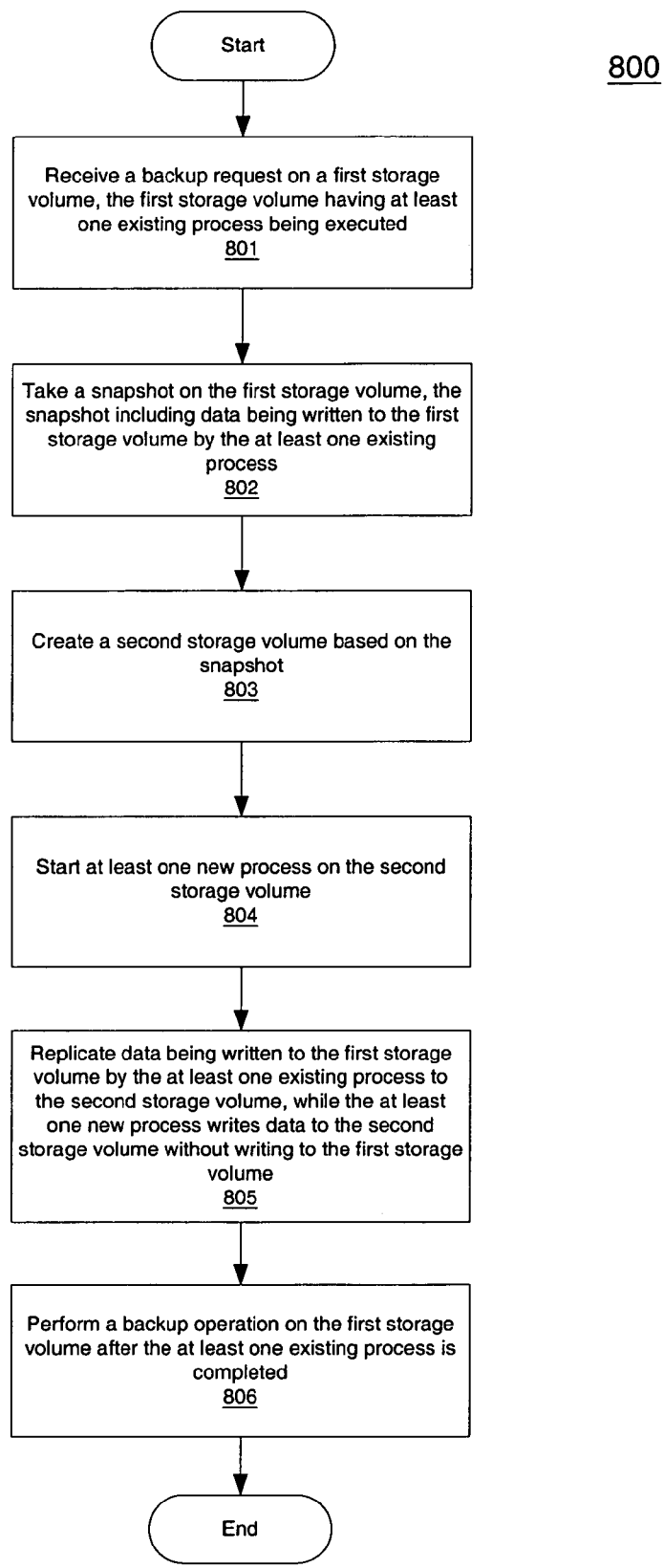
FIG. 8 shows a flowchart illustrating a backup process in accordance with yet another aspect of the invention.

FIG. 8, shows a flowchart illustrating an exemplary method of backing up a storage volume in accordance with an aspect of the invention. Referring to FIG. 8, at block 801, a backup request on a first storage volume is received, the first storage volume having at least one existing process being executed at this time. In one embodiment, such request may be received through an operating system (OS) scheduled by a user. Alternatively, such request may be received through a system administrator or through an automatic, machine generated request. When such a request is received, at block 802, the system takes a point-in-time copy or a snapshot of the first storage volume and the snapshot includes the at least one existing process being executed. At block 803, a second storage volume is created based on the snapshot. Once the second storage volume is created, at block 804, at least one new process starts on the second storage volume (but this new process does not start on the first storage volumes). At block 805, the system replicates data written to the first storage volume to the second storage volume, while the at least one existing process and the at least one new process are being executed on the first and the second storage volumes respectively. When the at least one existing process is completed on the first storage volume, at block 806, the first storage volume may be taken offline and a backup operation may be performed on the first storage volume. As a result, the backup operation is not delayed and the processes being executed are not disrupted.

Figure 9A:
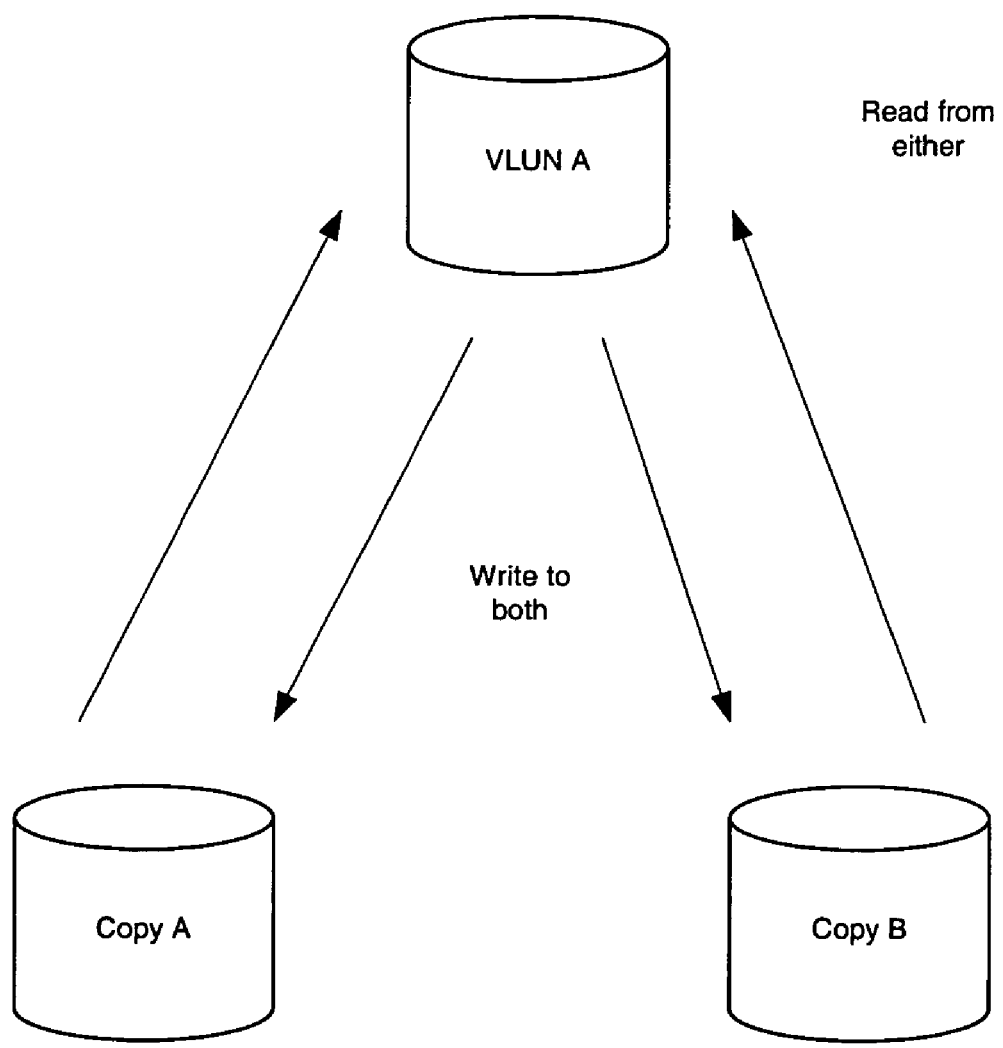
FIGS. 9A and 9B show block diagrams of an exemplary one-way data mirror using write mirroring in accordance with an aspect of the invention.
Figure 9B:
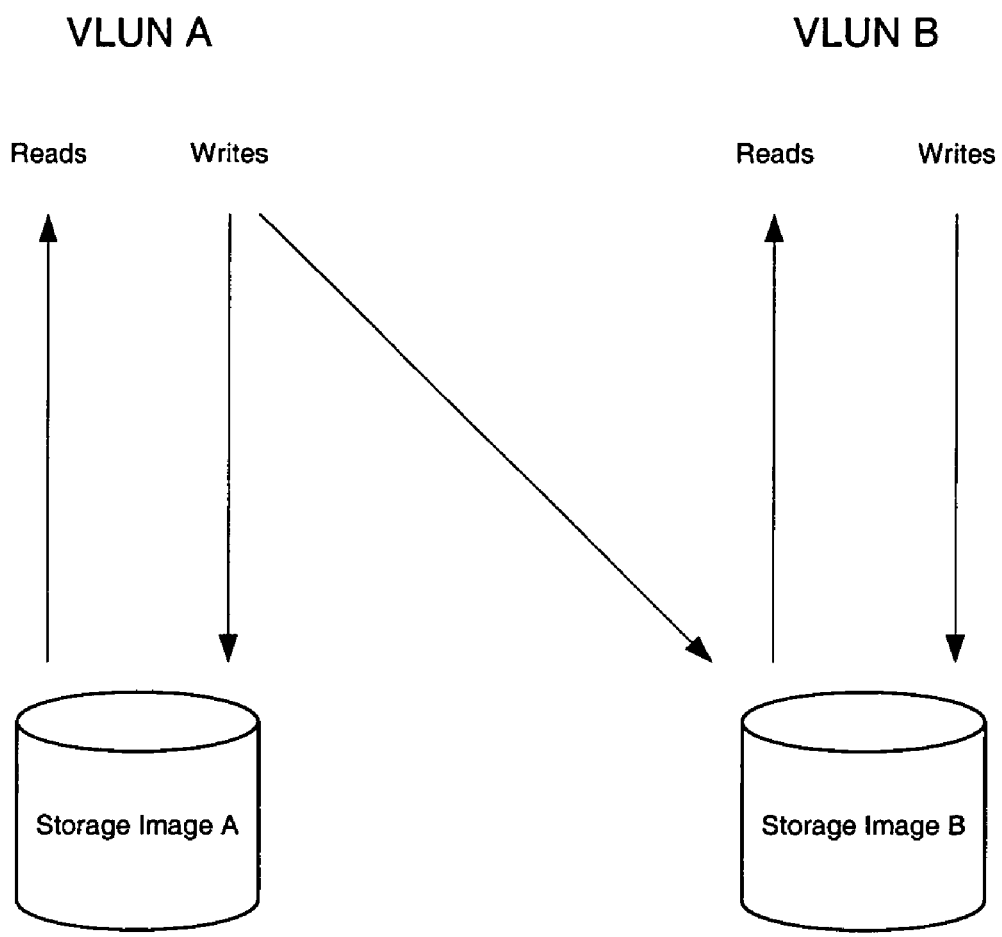

FIGS. 9A and 9B show block diagrams of a one-way data mirror using a write mirroring operation which may be used with a backup or other storage operation according to an aspect of the invention. In this exemplary embodiment, a mirror system is used to maintain a duplicate image and a primary image. The system creates a mirror copy of the VLUN to form storage images A and B. It will be appreciated that the mirror copy may be created before time 350 and before any request for a backup. The mirror copy may be created through conventional techniques (e.g. techniques which implement RAID Level 1). When a backup request is received (e.g. at time 350 in FIG. 3C), the system breaks the mirror, which is previously maintained before time 350, to form a broken mirror of the two images comprising a first image (image A) and a second image (e.g., storage image B). A process in operation when the mirror is broken continues to write the identical data to storage image A and storage image B. In this way, data being written to storage image A can be found in storage image B.

At time 350, any new read/write processes such as processes 304–306 are started on storage image B (VLUN B) and not on image A (VLUN A). Thereafter, as shown in FIG. 9B, existing applications or processes (e.g., processes 301–303) continue use storage image A and storage B and new processes (e.g., processes 304–306) use only storage image B. Whenever a new process (which starts after 350 shown in FIG. 3C) writes to storage image B, the data would not be replicated to storage image A. As a result, one-way mirroring is performed.

In one embodiment, the above transactions may be performed by a software module embedded in a one-way mirroring (OWM) device. Such OWM device may be a RAID compatible device and the software module may be a part of a RAID controller. In another embodiment, the software module may be a part of an operating system (OS) executed in the OWM device. Other configurations will be apparent to one of ordinary skill in the art. It is important to note that storage images A and B may be managed transparently to a user. The respective user does not need to know what and how a storage image is being accessed. The respective user only knows how to access VLUN A or VLUN B and the OWM device would transparently handle the actual one-way mirroring operation.

Figure 10:
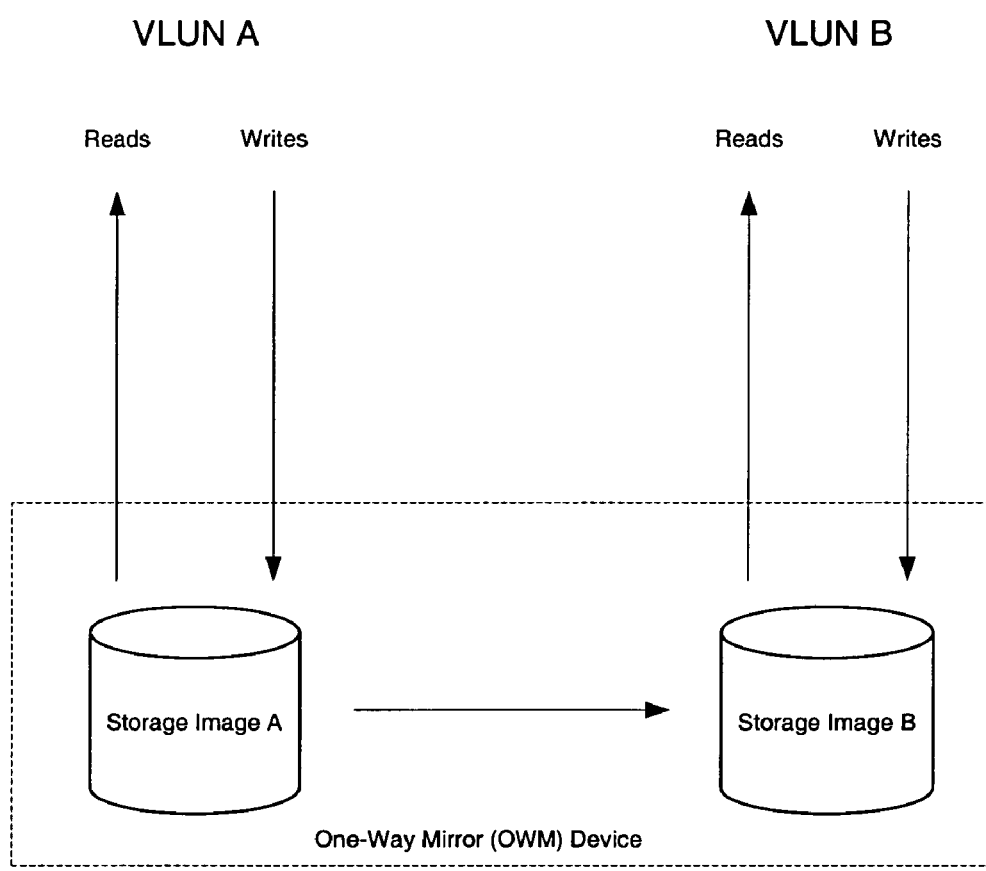
FIG. 10 shows a block diagram of an exemplary architecture in accordance with an aspect of the invention.

The one-way mirroring is performed by the system transparently as shown in FIG. 10. When a process (e.g. process 301 of FIG. 3C) writes to VLUN A, the data will be written to storage image A and the system writes the identical data to storage image B in the background, such that the respective application would not need to know how and when the data is mirrored to storage image B. It is important to know that the system only replicates data from storage image A to storage image B (e.g., one-way mirroring). After the existing processes (e.g., processes 301–303) are completed, the VLUN A (having storage image A) can be taken offline for other purposes such as backup operations.

As discussed above, the system may transparently manage all of the storage images internally. In one embodiment, the mechanism for performing the table operations and executing the reads and writes to the data areas of storage image A and storage image B is hidden from the application, operating system, and device drivers (e.g., disk drivers). VLUN A and VLUN B present a conventional storage interface similar to those represented by conventional VLUNs and the file systems or operating systems of the user (e.g. client) systems request the data by specifying a VLUN which is interpreted by the storage controller to specify a transaction with either image A or B depending on the methods described herein. As a result, embodiments of the invention do not require significant changes to the existing application, operating system, or device drivers.

Figure 11:
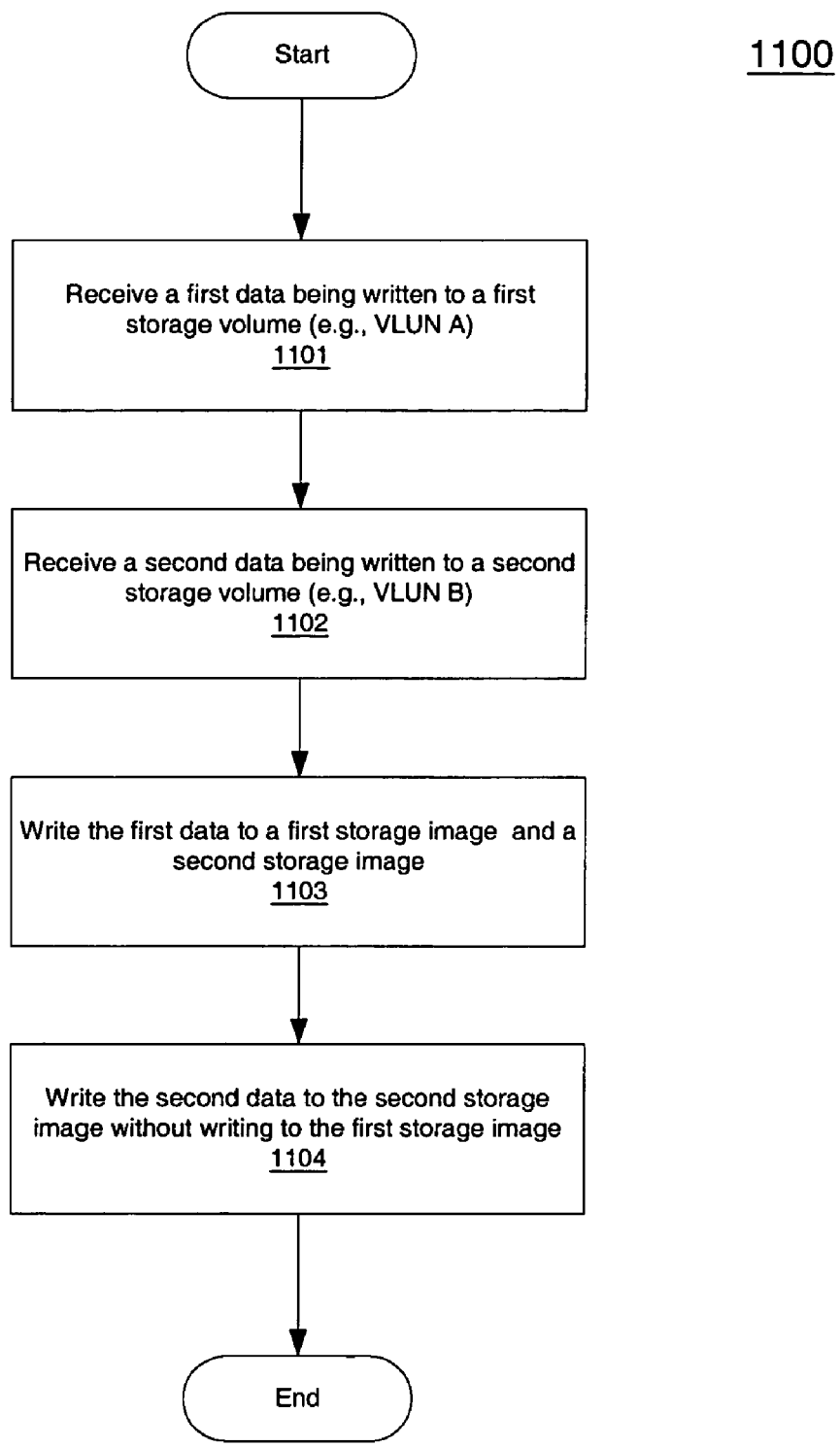
FIG. 11 shows a flowchart illustrating an exemplary method of performing a one-way data mirror using write mirroring in accordance with an aspect of the invention.

FIG. 11 shows a flowchart illustrating an exemplary process of one-way data mirror using write mirroring according to an aspect of the invention. In one embodiment, the process 1100 includes receiving a first data being written to a first storage volume, receiving a second data being written to a second storage volume, writing the first data to a first storage image and a second storage image, and writing the second data to the second storage image.

Referring to FIG. 11, prior to a backup request being received, a mirrored copy of an original storage image of a volume such as VLUN A is created and a second storage image is created as the mirrored copy. In one embodiment, the second storage image is created using an ordinary method such as a RAID 1 technique. After the second storage image is created, a backup request may be received which causes a breaking of the mirror and any new process (after the breaking of the mirror) such as a second process is executed on the second storage image while an existing process such as a first process continues on the first storage image and is mirrored to the second storage image. At block 1101, when a request to write a first data to the first storage volume is received and a request to write a second data to the second storage volume is received at block 1102, the system writes the first data to the first storage image and the second storage image at block 1103. At block 1104, however, the system writes the second data to the second storage image without writing to the first storage image since the second data is part of the second process which started after the backup request. As a result, the second storage image represents a one-way mirrored storage of the first storage image. Once the processes existing at the time breaking of the mirror (e.g., the first process) are finished, the first storage volume (having the first storage image) can be taken offline for other purposes such as backup operations, without disrupting the services being provided to the users of the data (e.g., applications).

Figure 12:
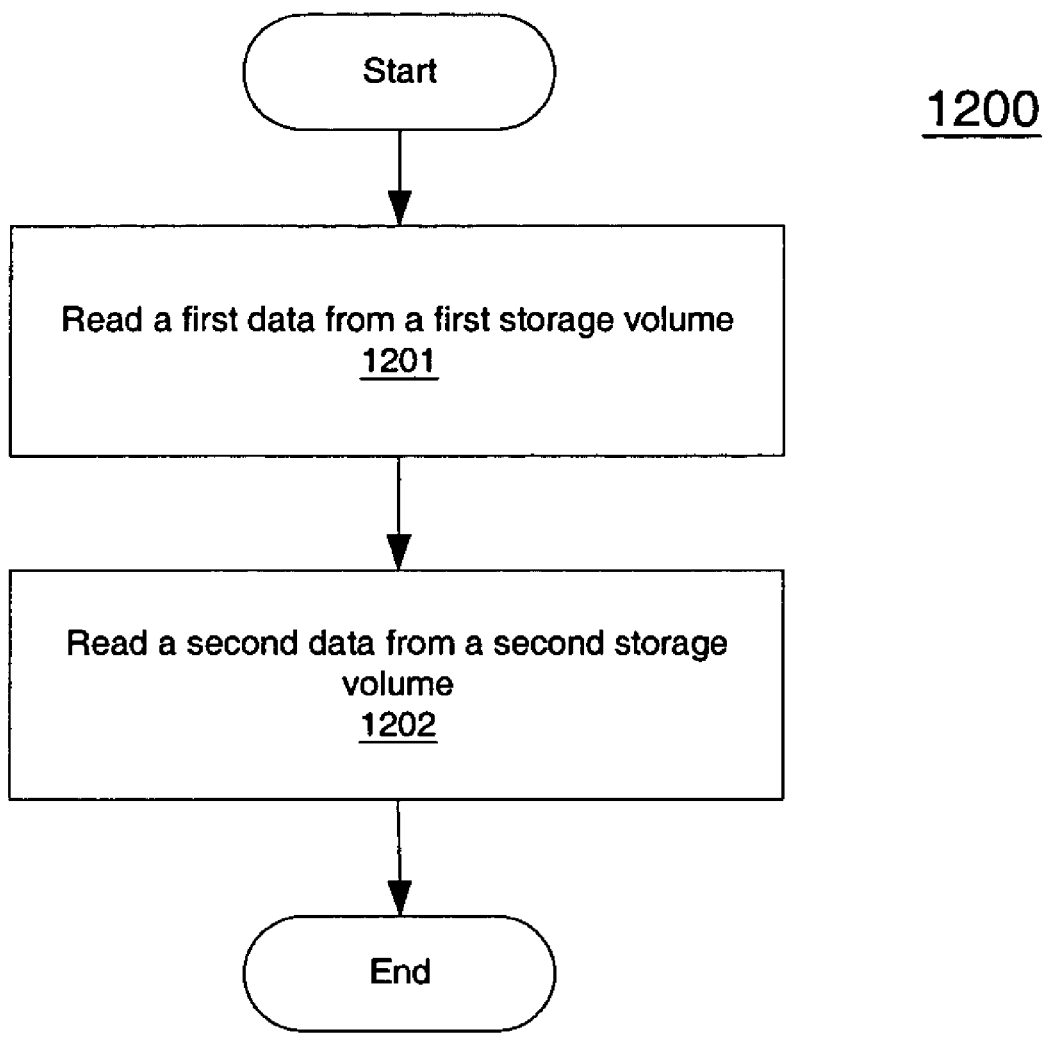
FIG. 12 shows a flowchart illustrating an exemplary method of performing a one-way data mirror using write mirroring in accordance with another aspect of the invention.

FIG. 12 shows a flowchart illustrating an exemplary method of reading data in a one-way data mirror system using write mirroring in accordance with one aspect of the invention. This reading process operates in the context of the system shown in FIGS. 10 and 11. Thus, the first storage image is used for processes (e.g. a first process) in operation at the time when the mirror is split and a second storage image is used for processes (e.g. a second process) which starts after the mirror is split. After the second storage image is split from the mirror, any new read process such as a second process is executed on the second storage image (shown as operation 1204 in FIG. 12) while an existing read process such as a first process (which was in operation when the split occurred) continue to be executed on the first storage image (shown as operation 1205 in FIG. 12). Once the existing processes (e.g., processes which started before the mirror split) finish, the first storage volume having a first storage image can be taken offline for other purposes such as backup operations, without disrupting the services being provided to the users of the storage system.

As discussed above, in order to ensure that data written to the one-way mirrored storage volumes (e.g., VLUN A and VLUN B) is not corrupted during the accesses (which may be substantially simultaneous), in one embodiment, two groups of data locks may be provided. The first group contains those required by the backup operations discussed above to ensure proper and orderly access to the VLUNs. These locks are maintained independently and separate from the storage volume being backed up and are not part of the data to be backed up. The second group of locks is those common and relevant locking mechanisms for VLUNs (virtualized storage in the form of virtual LUNs). For example, if the VLUN is a RAID-5 compatible storage volume, stripe locks may be utilized for reads and writes, to prevent one process from writing to a data stripe while another process is reading from the same data stripe. It would be appreciated that other lock mechanisms may be apparent to an ordinary person skilled in the art to use with embodiments of the invention.

Figure 13:
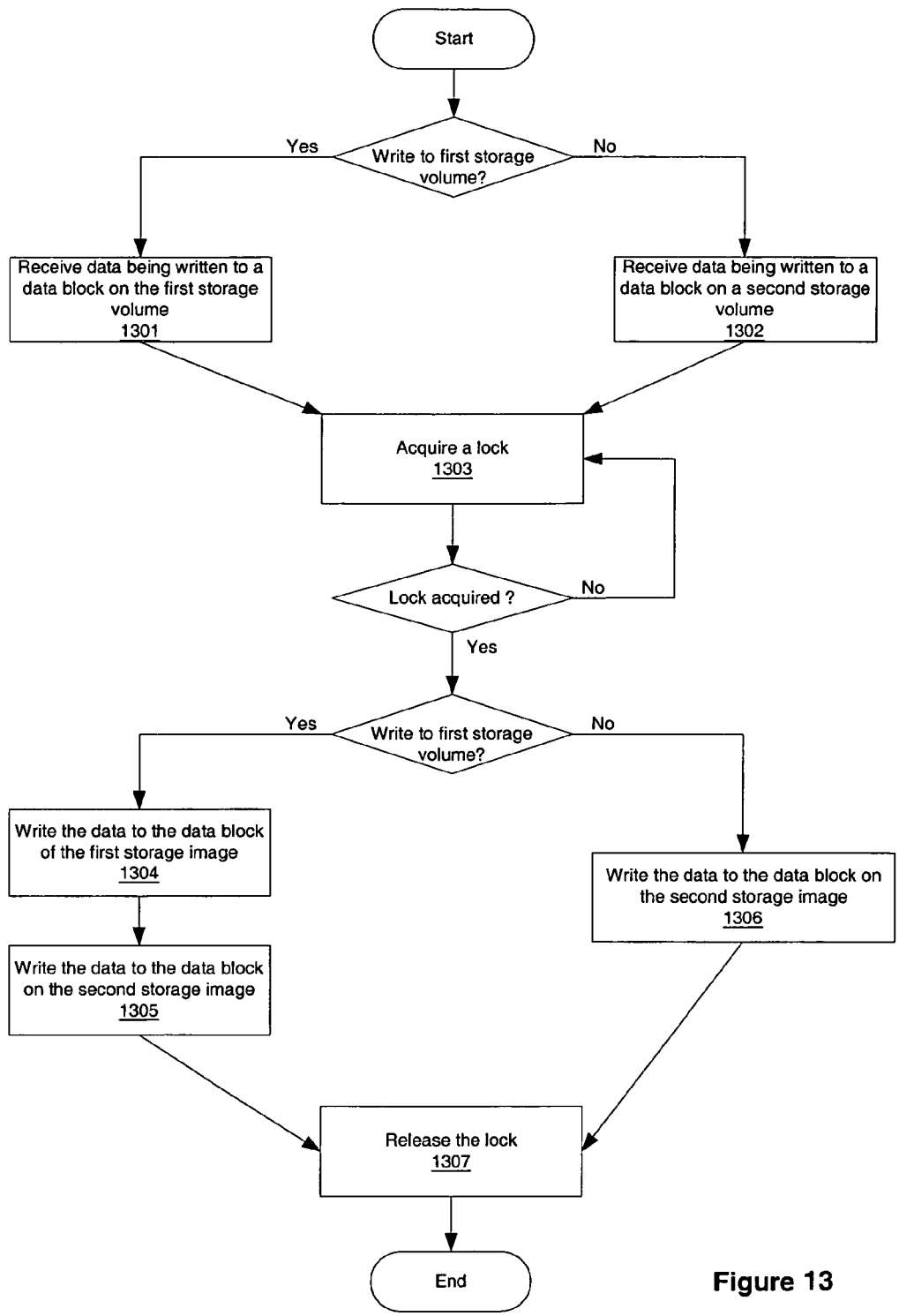
FIG. 13 shows a flowchart illustrating an exemplary method of performing a one-way data mirror using write mirroring in accordance with yet another aspect of the invention.

FIG. 13 shows a block diagram illustrating an exemplary one-way mirroring process in accordance with one aspect of the invention. Referring to FIG. 13, according to one embodiment, at block 1301, when the system receives data being written to a data block of a first storage volume (e.g., VLUN A) (from a process in progress when the mirror split was requested), the system tries to acquire a lock at block 1303 to prevent other processes from accessing the same volume. If the lock is not available (e.g., the lock is acquired by other processes), the current process is suspended until the lock is available. Once the lock is acquired, at block 1304, the data is written to the corresponding data block of the first storage image. At block 1305, the identical data is written to the second storage image. Thereafter, at block 1307, the lock is released after the writing is completed.

Meanwhile, at block 1302, when the system receives data being written to a data block of a second storage volume (from a read or write process started after the mirror was split), the system also tries to acquire the lock to prevent other processes from accessing the same area. If the lock is not available (e.g., the lock mechanism is acquired by other processes), the request is suspended until the lock is acquired successfully. Once the lock is acquired, at block 1306, the data is written to the corresponding data block of the second storage image (e.g., storage image B) without writing to the first storage image (e.g., storage image A). Thereafter, at block 1307, the lock is released after the writing is completed.

Figure 14:
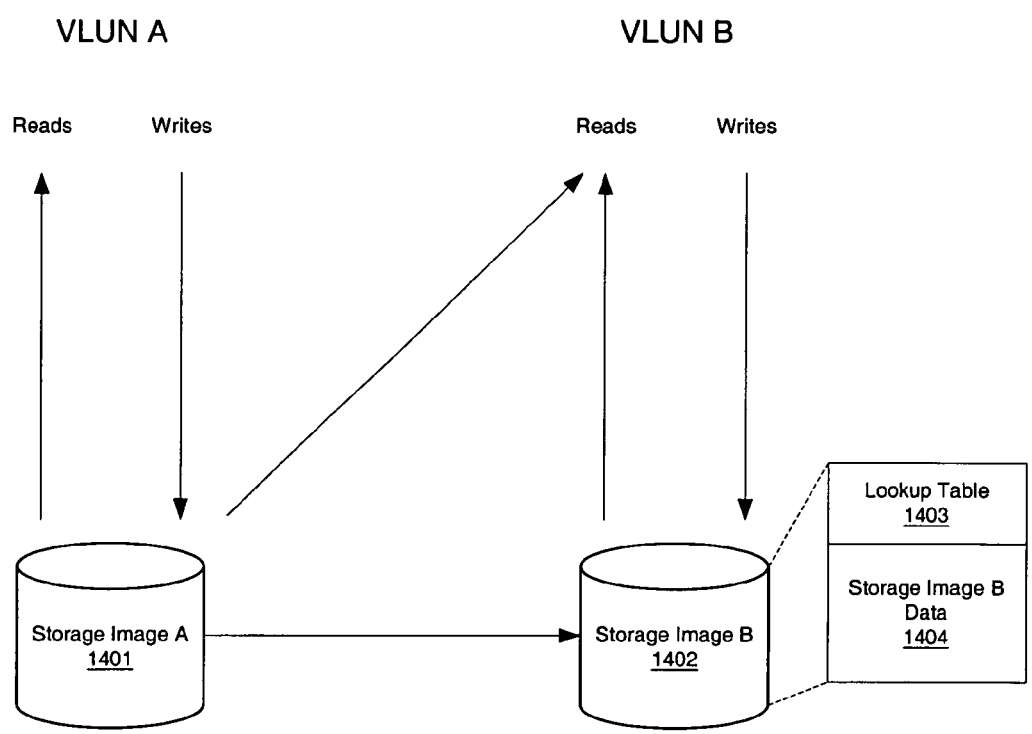
FIG. 14 shows a block diagram of an exemplary one-way data mirror using write logging in accordance with an aspect of the invention.

FIG. 14 shows a block diagram of an exemplary system performing a one-way data mirror using write logging in accordance with an aspect of the invention. In one embodiment, the system includes VLUN A having storage image A 1401, VLUN B having storage image 1402 and a lookup table 1403. The storage image A and storage image B may be created using a conventional method. They may be created using a mirror image of the original image or using a snapshot of the original image. When a backup request for a VLUN is received, the system makes a copy of the VLUN (e.g., through a snapshot of the VLUN) and creates VLUN A having storage image A and VLUN B having storage image B.

Instead of storing redundant data in both images, this embodiment stores only one copy of the data in one image, such as storage image A. In addition, the embodiment stores the difference of the mirrored volume (e.g., difference between VLUN A and VLUN B) in a second storage image, such as storage image B. A lookup table 1403 is maintained to indicate whether there are any differences between two images. If there are differences between two images, the lookup table 1403 may indicate which image contains newer data, such that a read from either volume can retrieve the correct data on the images. In this embodiment, the newer data may be in either storage image A or storage image B. If the update is made on VLUN A, it is stored in storage image A and it can be seen on VLUN A and VLUN B. If the update is made in VLUN B, it is stored in storage image B.

In one embodiment, the lookup table 1403 contains a plurality of entries which may be indexed based on the location (e.g., offset) of the corresponding data block. Each of the plurality of entries in the lookup table 1403 may just include a flag indicating which volume contains the latest version of data. Alternatively, each of the plurality of entries in the lookup table 1403 may include a pointer (e.g., address) pointing to the location of the corresponding data block in the respective image. Other information may be included in the lookup table 1403. The lookup table 1403 may be maintained independent to the storage images. In this embodiment, the lookup table 1403 is associated with the second storage image B.

When a backup operation is initiated at time 407 of FIG. 4, the storage image B lookup table 1403 and data areas 1404 are created (based on the original VLUN being backed up). The lookup table 1403 contains information regarding data stored in the data areas and its corresponding location being stored.

During a write operation to VLUN A, the lookup table 1403 associated with storage image B is checked to determine whether the data block being written to is located in storage image A or storage image B. If the data block to be written is located in the data areas of storage image B, the corresponding entry of the lookup table is deleted to indicate the data block is located in storage image A and the space of the corresponding data block in storage image B is deallocated. The data is then stored in storage image A and the access from storage image B of the data block retrieves the data from the corresponding data block in storage image A.

During a read operation to VLUN B, the lookup table 1403 is checked to determine whether the data block being read is located in storage image A or storage image B. If the data block to be read is located in the data areas of storage image B, the data is fetched from the corresponding data areas of storage image B. Otherwise, the data is fetched from the corresponding data areas of storage image A.

During a write operation to VLUN B, the lookup table 1403 is checked and an entry for the data is created in the lookup table 1403 to indicate the data block is located in storage image B, if the corresponding entry does not exist. Thereafter, the data is written to storage image B.

As discussed above, the system may transparently manage all of the storage images (e.g., storage image A and storage image B) internally (e.g. within the storage controller system). In one embodiment, the mechanism for performing the table operations and executing the reads and writes to the data areas of storage image A and storage image B is hidden from the applications, operating system, and device drivers (e.g., disk drivers) on host systems which are involved in the read or write transactions with the storage system. VLUN A and VLUN B present a conventional storage interface similar to those represented by conventional VLUNs. As a result, embodiments of the invention may not require significant changes to the existing application, operating system, or device drivers.

Figure 15:
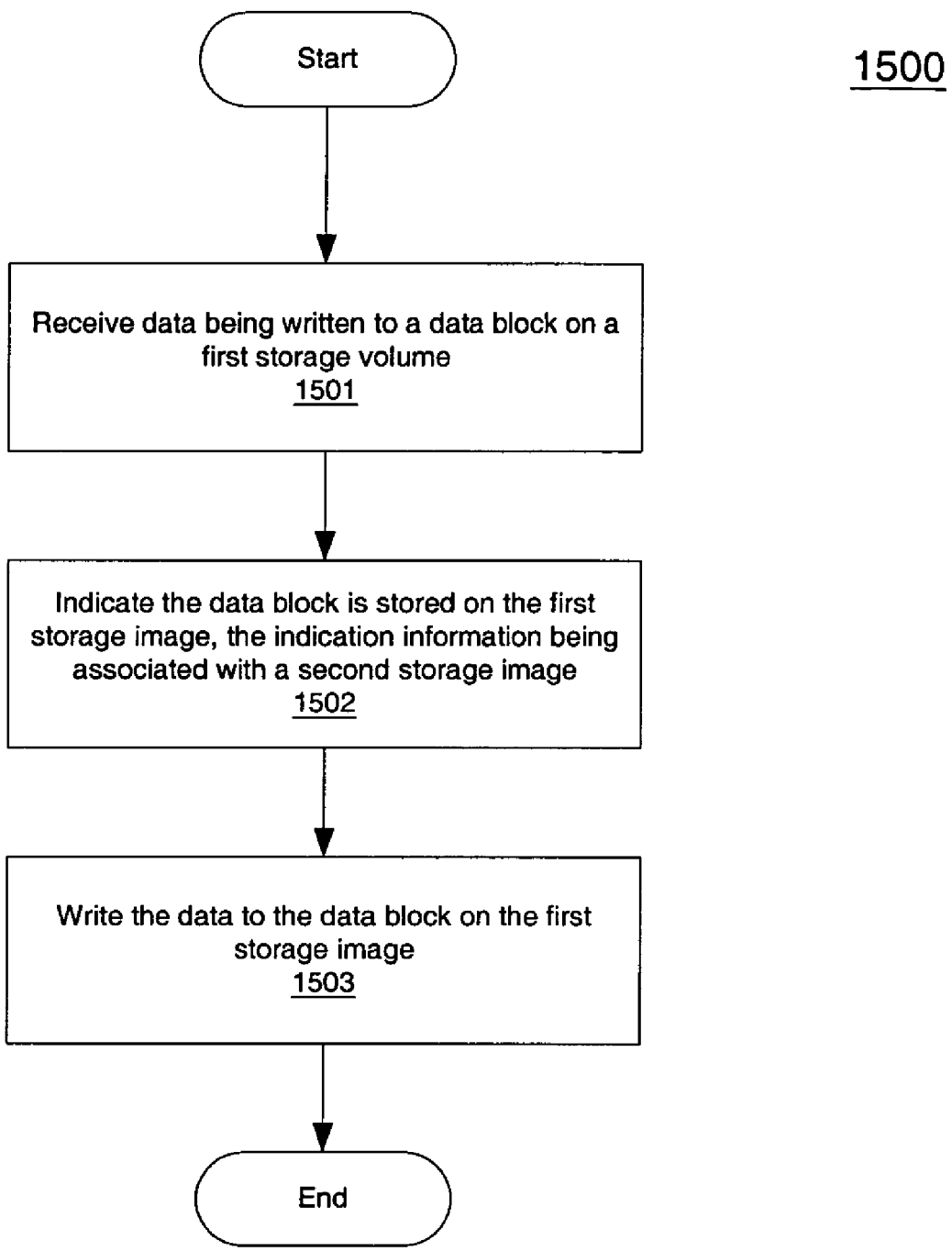
FIG. 15 shows a flowchart illustrating an exemplary method of one-way data mirror using write logging in accordance with an aspect of the invention.

FIG. 15 shows a flowchart illustrating an exemplary method of performing a one-way data mirror using write logging in accordance with an aspect of the invention. In one embodiment, the exemplary method 1500 includes receiving a first data being written to a data block on a first storage volume, indicating the data block is stored in a first storage image, the indication information being associated with a second storage image, and writing the first data to the data block on the first storage image. In an alternative embodiment, the exemplary method 1500 further includes receiving a second data being written to the data block in a second storage volume, updating the indication information to indicate the data block being stored on the second storage image, and writing the second data to the data block on the second storage image. In a further embodiment, the exemplary method 1500 further comprises receiving a request to read from a data block on a second storage volume, determining whether the data block is stored on the first storage image or the second storage image, based on indication information associated with the second storage image, reading the data block from the first storage image if the data block is stored on the first storage image, and reading the data block from the second storage image if the data block is stored on the second storage image.

Referring to FIGS. 14 and 15, at block 1501, when the system receives data to be written to a data block on a first storage volume such as VLUN A, the system indicates the data block is stored in the first storage image at block 1502, the indication information is associated with a second storage image. In one embodiment, such information may be stored in a lookup table, such as lookup table 1403, associated with the second image B. At block 1503, the system then writes the data to the data block in the first storage image. The indication information indicates that the latest version of data for this data block is stored in the first storage image. When a read request is received at a second storage volume (VLUN B), the data can be retrieved from the first storage image based on the indication information stored in the lookup table associated with the second storage image (e.g., image B).

Figure 16:
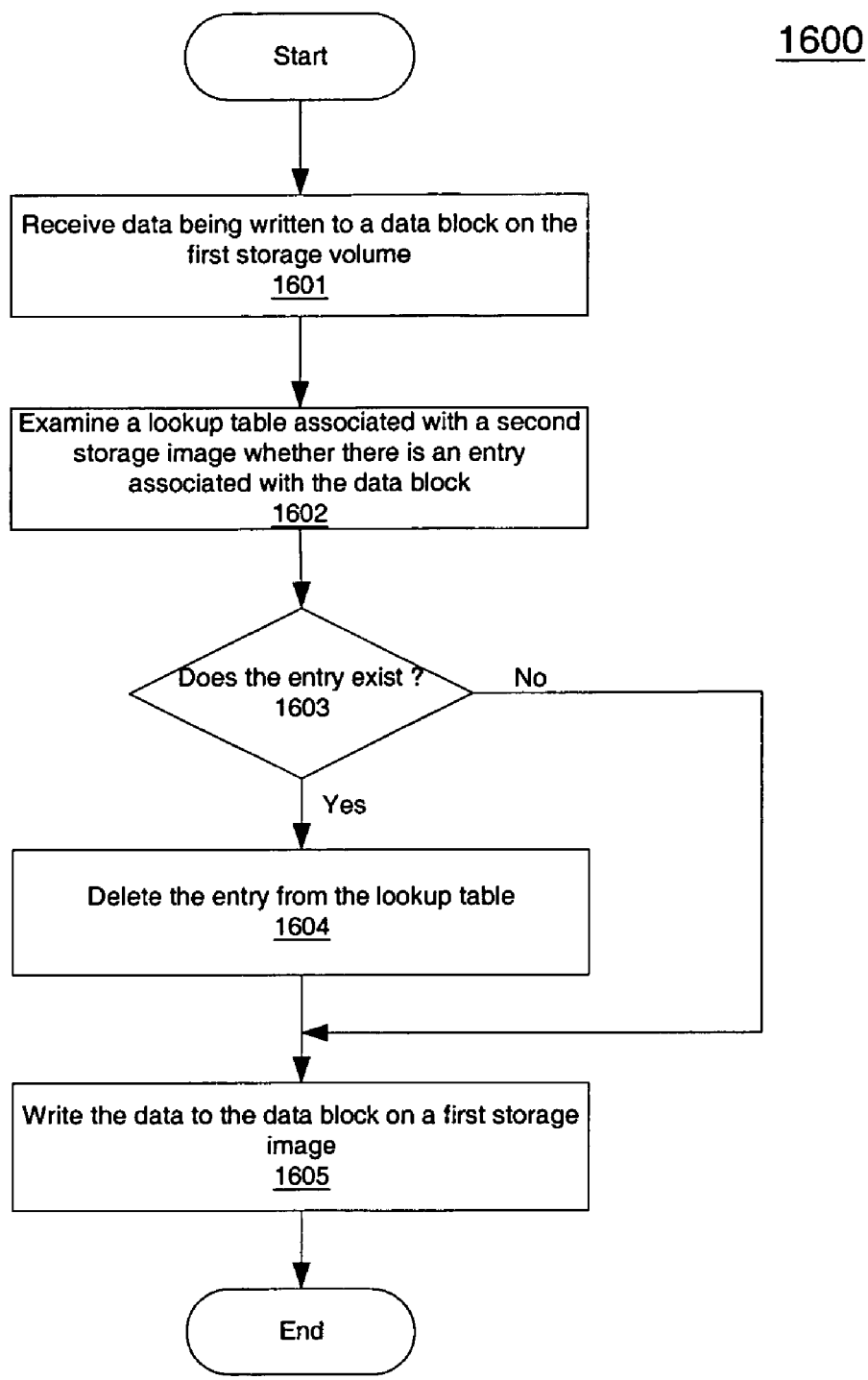
FIG. 16 shows a flowchart illustrating an exemplary method of one-way data mirror using write logging in accordance with another aspect of the invention.

FIG. 16 shows a flowchart illustrating an exemplary method of performing a data mirror using write logging in accordance with another aspect of the invention. In one embodiment, at block 1601, a request to write to a data block of a first storage volume (e.g., VLUN A) is received. At block 1602, the system examines a lookup table, such as lookup table 1403 of FIG. 14, associated with a second storage image (e.g., image B) to determine whether there is an entry, in the lookup table, associated with the data block being accessed (block 1603). If the corresponding entry exists in the lookup table, at block 1604, the system deletes the entry from the lookup table to indicate the data block is located on the first storage image (e.g., image A), and the system deallocates the storage space in the data storage area of the second storage image (e.g. image B). Thereafter, at block 1605, the data is written to the data block on the first storage image.

Figure 17:
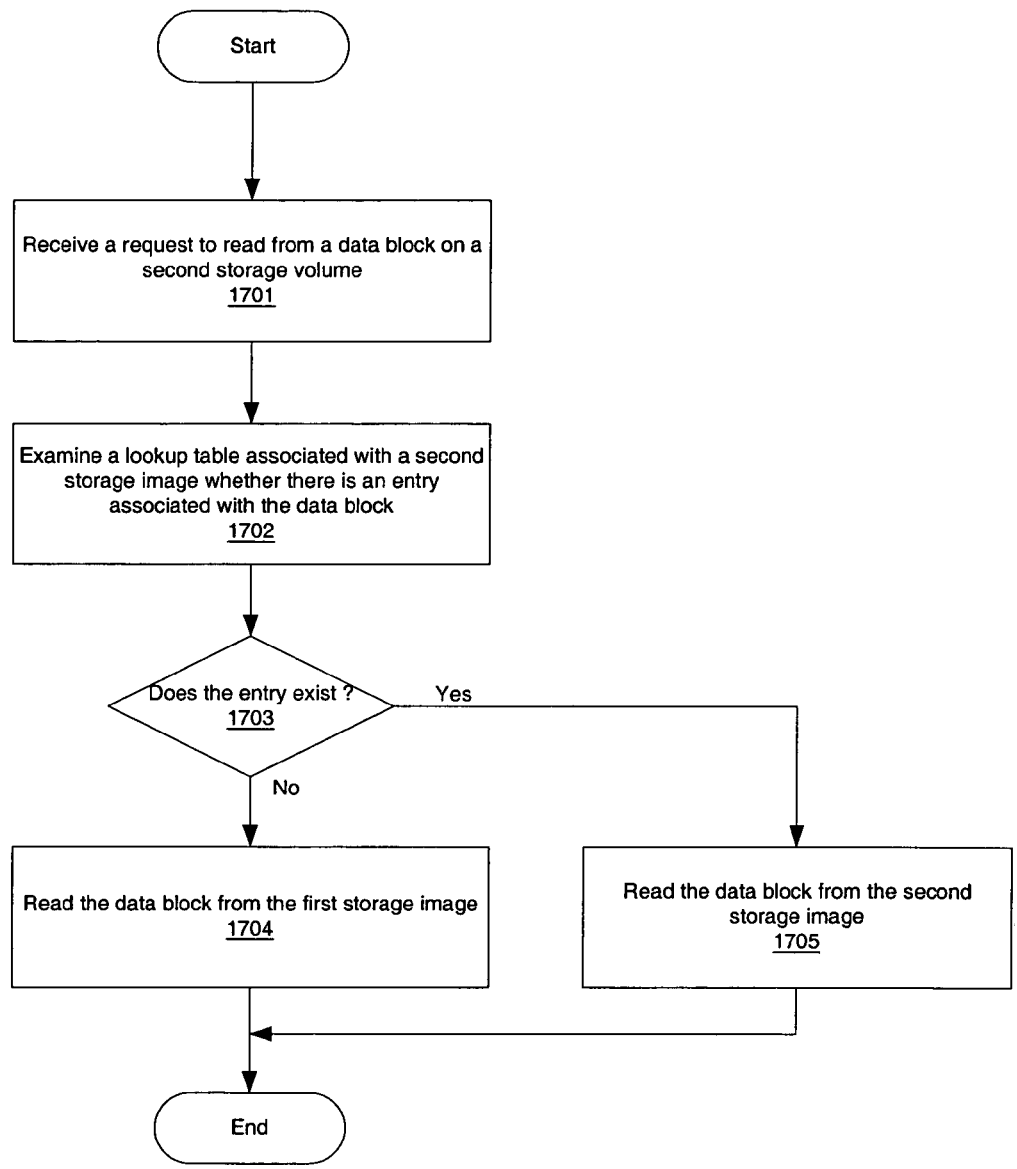
FIG. 17 shows a flowchart illustrating an exemplary method of one-way data mirror using write logging in accordance with yet another aspect of the invention.

FIG. 17 shows a flowchart illustrating an exemplary method of a read operation in accordance with a write logging implementation of one aspect of the invention. Referring to FIG. 17, according to one embodiment, at block 1701, a request for reading from a data block on a second storage volume (e.g., VLUN B) is received. At block 1702, the system examines a lookup table (e.g., lookup table 1403 of FIG. 14) associated with a second storage image to determine whether, at block 1703, there is an entry, in the lookup table, associated with the data block. If there is an entry corresponding to the data block in the lookup table, at block 1705, the data is then read from the data block of the second storage image. Otherwise (an entry for the data block is not in the table), at block 1704, the data is read from the data block of the first storage image.

Figure 18:
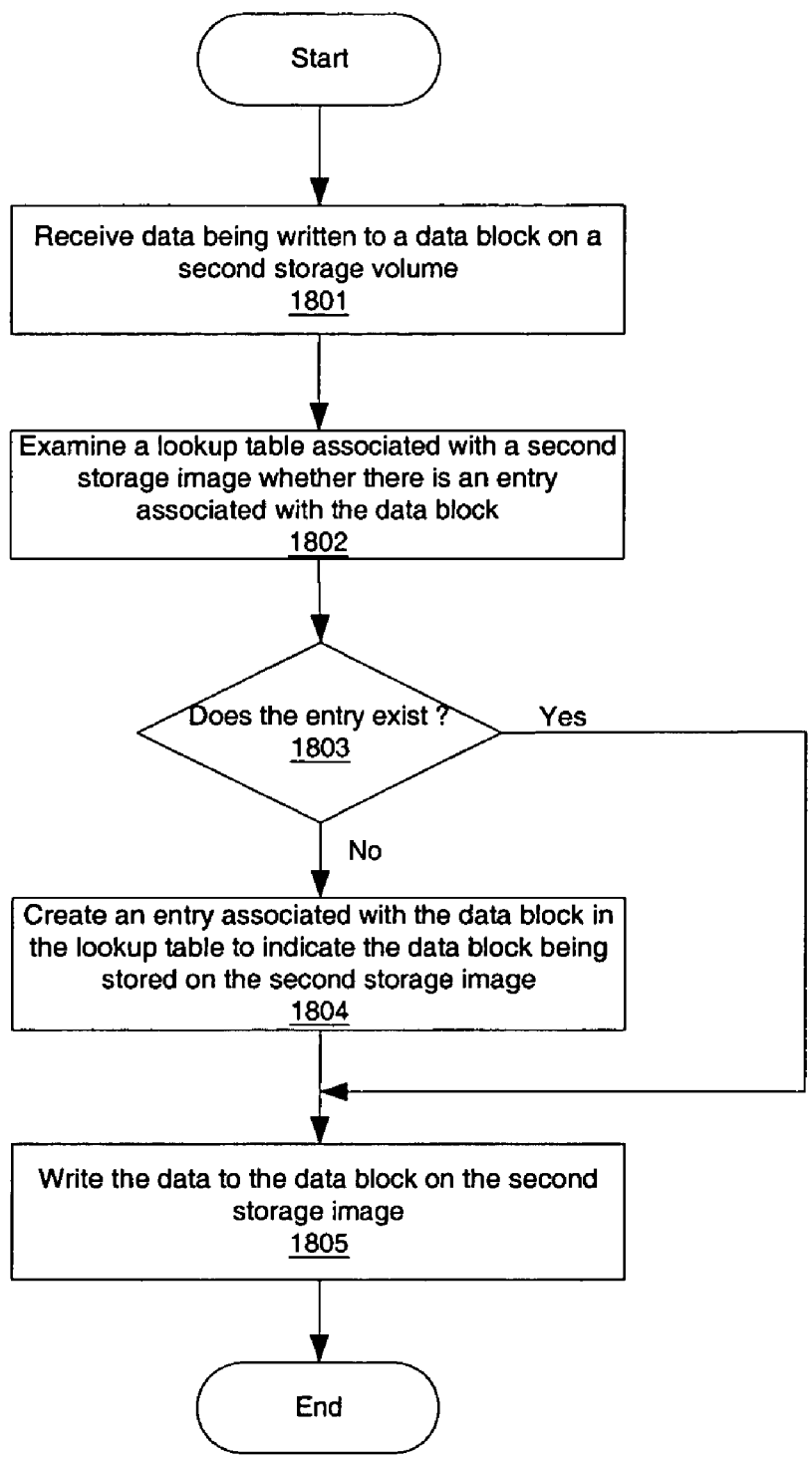
FIG. 18 shows a flowchart illustrating an exemplary method of one-way data mirror using write logging in accordance with yet another aspect of the invention.

FIG. 18 shows a flowchart illustrating an exemplary method of a write operation in accordance with a write logging implementation of an aspect of the invention. Referring to FIGS. 14 and 18, at block 1801, the system receives data to be written to a data block on a second storage volume such as VLUN B. At block 1802, the system examines a lookup table, which is associated with a second storage image, to determine whether the data block is stored in the second storage image (e.g., image B). In one embodiment, this lookup table may be lookup table 1403 associated with the second image. If the data block has already been stored (as a prior version of the data block) in the second storage image, then the system then writes the data to the corresponding data block in the second storage image (in operation 1805). The information in the lookup table indicates that a version of data is already stored on the second storage image. If an entry for the data block does not exist in the lookup table (as determined in operation 1803), then, in operation 1804, an entry is created in the lookup table, which entry indicates that the data block is being stored in the second storage image. After the entry is created in operation 1804, the data block is written to the second storage image in operation 1805. When a read request is received for the second storage volume (e.g., VLUN B), the data can be retrieved from the second storage image based on the information stored in the lookup table associated with the second storage image.

As discussed above, in order to ensure that data written to the one-way mirrored storage volumes (e.g., VLUN A and VLUN B) is not corrupted during the near simultaneous accesses, in one embodiment, two groups of data locks may be provided. The first group contains those required by the operations discussed above to ensure proper and orderly access to the VLUNs. These locks are maintained independently from the storage volume being backed up and are not part of the data to be backed up. The second group of locks may contain those common and relevant locking mechanisms for VLUNs (virtualized storage in the form of the virtual LUNs). For example, if the VLUN is a RAID-5 compatible storage volume, stripe locks may be utilized for reads and writes, to prevent one process from writing to a data stripe while another process is reading from the same data stripe. It would be appreciated that other lock mechanisms may be apparent to an ordinary person skilled in the art to use with embodiments of the invention.

Figure 19:
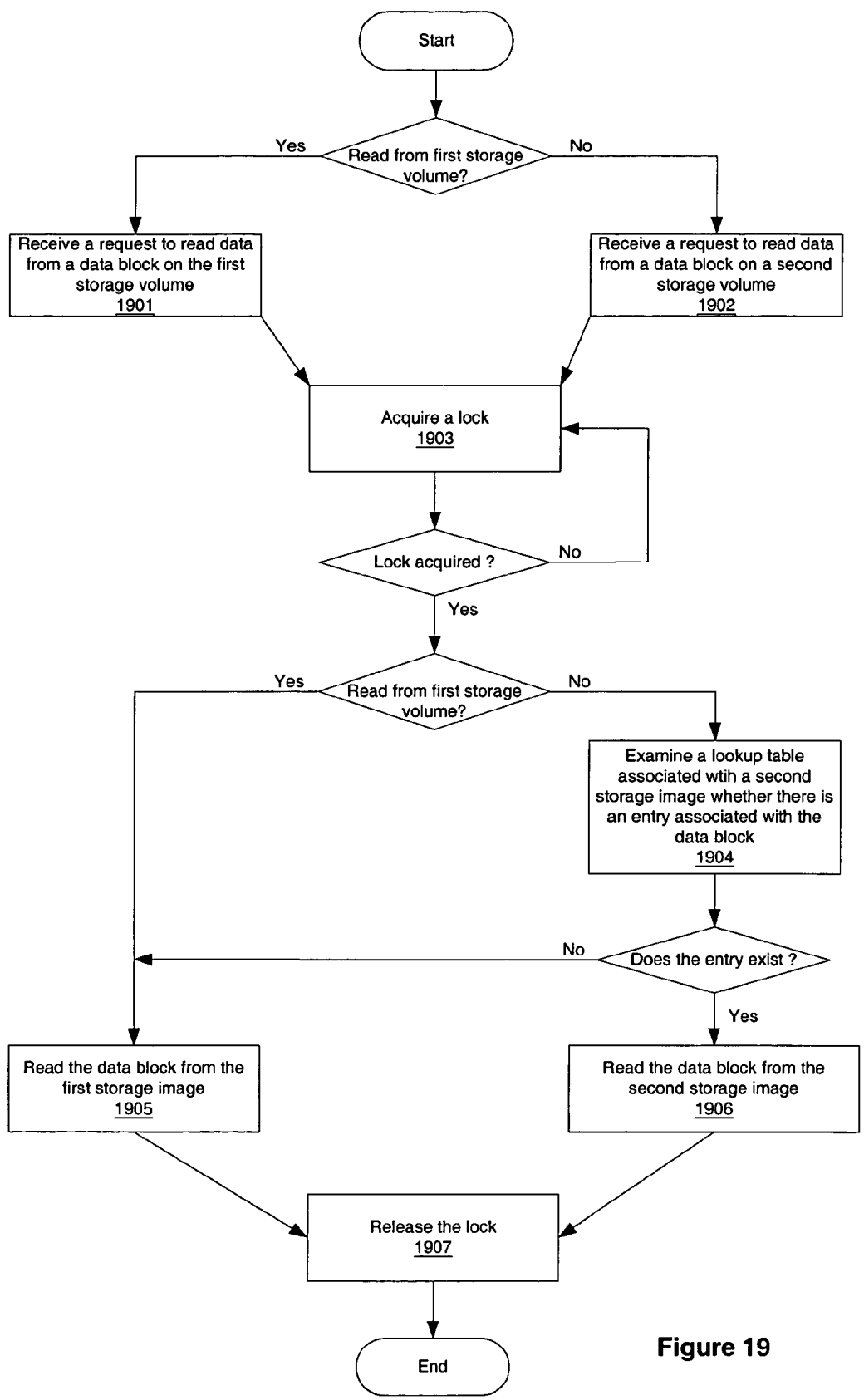
FIG. 19 shows a flowchart illustrating an exemplary method of one-way data mirror using write logging in accordance with yet another aspect of the invention.

FIG. 19 shows a flowchart illustrating an exemplary method for performing read operations in accordance with a write logging implementation of one aspect of the invention. Referring to FIG. 19, according to one embodiment, at block 1901, a request to read data from a data block on a first storage volume (e.g., VLUN A) is received. At block 1903, the system tries to acquire a lock to prevent other processes, such as the one received at block 1902, from accessing the same volume. If the lock is not available (e.g., acquired by other processes), the current process is suspended, such as, for example, putting the current process in a queue, until the lock is available. Once the lock is acquired, at block 1905, the data stored at the corresponding data block of a first storage image is retrieved. Thereafter, at block 1907, the acquired lock is released.

Meanwhile, at block 1902, a request to read from a data block from a second storage volume (e.g., VLUN B) is received. Similarly, the system tries to acquire the lock to prevent other processes, such as one received at block 1901, from accessing the same volume. If the lock is not available (e.g., acquired by other processes), the current process is suspended until the lock is available. Once the lock is acquired, at block 1904, the system examines a lookup table associated with a second storage image to determine whether there is an entry associated with the data block. An entry in the lookup table indicates that the desired data block to be read is stored in the second storage image. If there is no entry (e.g., the data block which is to be read is located at the first storage image such as storage image A), at block 1905, the system retrieves the data from the first storage image. Otherwise (the table contains one entry for the desired data block), at block 1906, the system retrieves the data from the second storage image. Thereafter, at block 1907, the acquired lock is released.

It is important to note that, in this embodiment, an access (e.g. read) for data either from the first or second storage image is completely transparent to the applications requesting the data. The respective applications requesting data at block 1901 and block 1902 only know they are dealing with first and second storage volumes (e.g., VLUN A and VLUN B) respectively which may be considered virtualized storage. They have no knowledge whether they are receiving data from the first storage image (e.g., image A) or from the second storage image (e.g., image B). For example, the application accessing data from block 1902 does not know whether the data received is from the first or the second storage image. The accessing either storage image (e.g., image A or B) is managed transparently and internally inside the OWM device, such as OWM device shown in FIG. 10. The respective OWM device presents to the applications a conventional storage interface VLUN A and VLUN B and internally manages the underlying storage images (e.g., images A and B).

Figure 20:
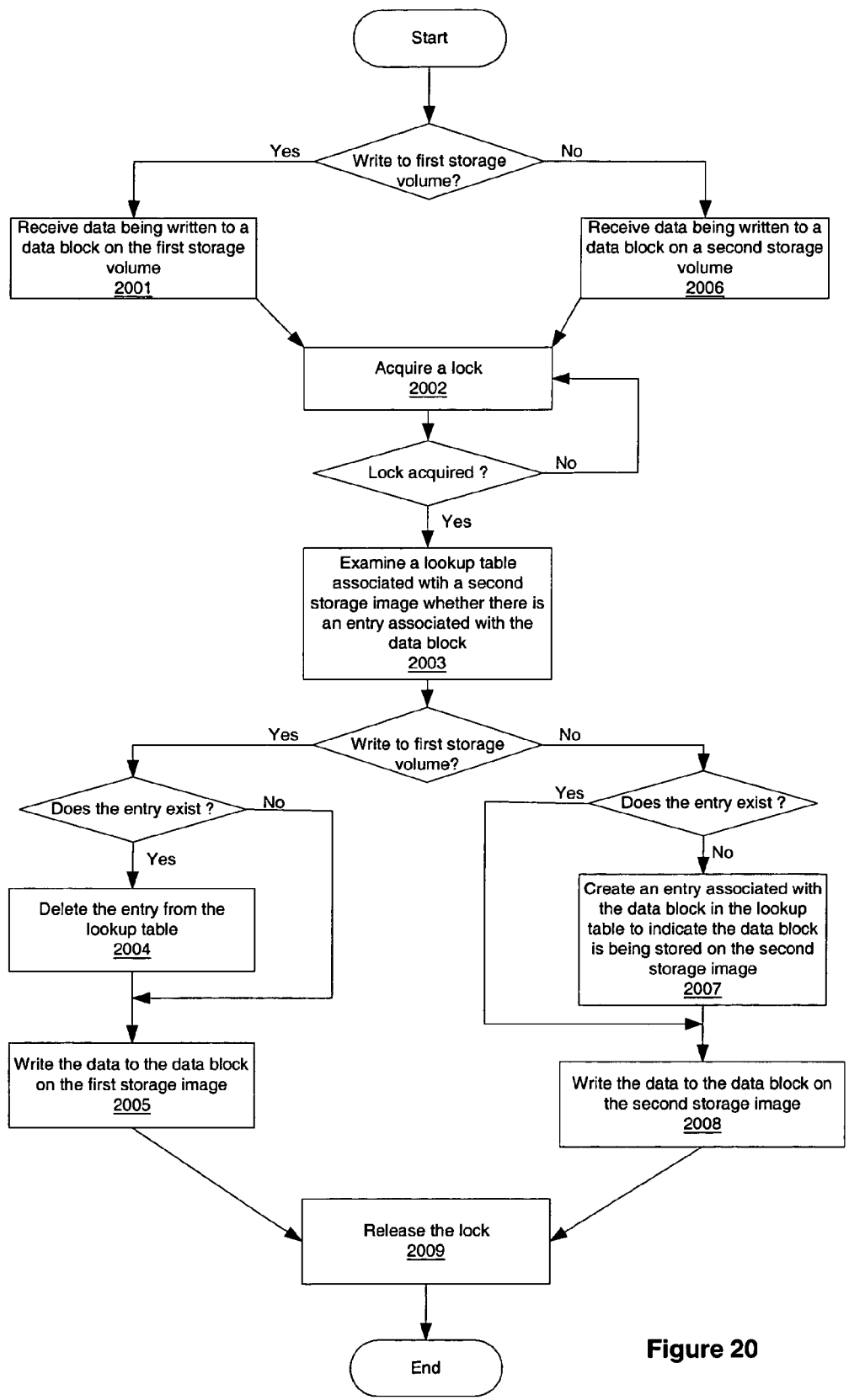
FIG. 20 shows a flowchart illustrating an exemplary method of one-way data mirror using write logging in accordance with yet another aspect of the invention.

FIG. 20 shows a flowchart illustrating an exemplary method for performing write operations, with locks, in accordance with a write logging implementation of another aspect of the invention. Referring to FIGS. 14 and 20, at block 2001, data is received to be written to a data block on the first storage volume (e.g., VLUN A). In order to ensure that no other process attempts to access the same volume, at block 2002, the system acquires a lock. In addition, if the VLUN being accessed is a RAID-5 compatible storage volume, there may be an additional stripe lock mechanism (not shown) used to prevent the parity from becoming corrupted, which is not pertinent to the embodiments of the present application. If the lock is not acquired (e.g., the lock has been acquired by another process and has not been released), the request is suspended until the lock is acquired successfully. Once the lock is acquired, at block 2003, the system examines a lookup table associated with a second storage image, such as lookup table 1403 associated with image B, to determine whether there is an entry, in the table, associated with the data block being accessed. If there is an entry associated with the data block, at operation 2004, the system deletes the entry from the lookup table to indicate the data block is located at the first storage image (e.g., image A). Thereafter, at operation 2005, the data is written to the data block on the first storage image (e.g., image A) and the lock acquired is released at block 2009 after the transaction finishes.

Meanwhile, a second data is received to be written to the second storage volume (e.g., VLUN B) at block 2006. Similarly, the process tries to acquire the lock at block 2002. If the lock has been acquired by another process for this second storage volume, this process is suspended until the lock is available. Once the lock is acquired, at block 2003, the system examines a lookup table associated with a second storage image, such as lookup table 1403 associated with image B, to determine whether there is an entry, in the table, associated with the data block being accessed. If there is such an entry, then in operation 2008, the data is written to the data block on the second storage image (e.g. image B). If there is no entry associated with the data block, at block 2007, the system creates an entry in the lookup table to indicate the data block is located at the second storage image. Thereafter, at block 2008, the data is written to the data block on the second storage image (e.g., image B) and the lock acquired is released at block 2009 after the transaction finishes.

Figure 21:
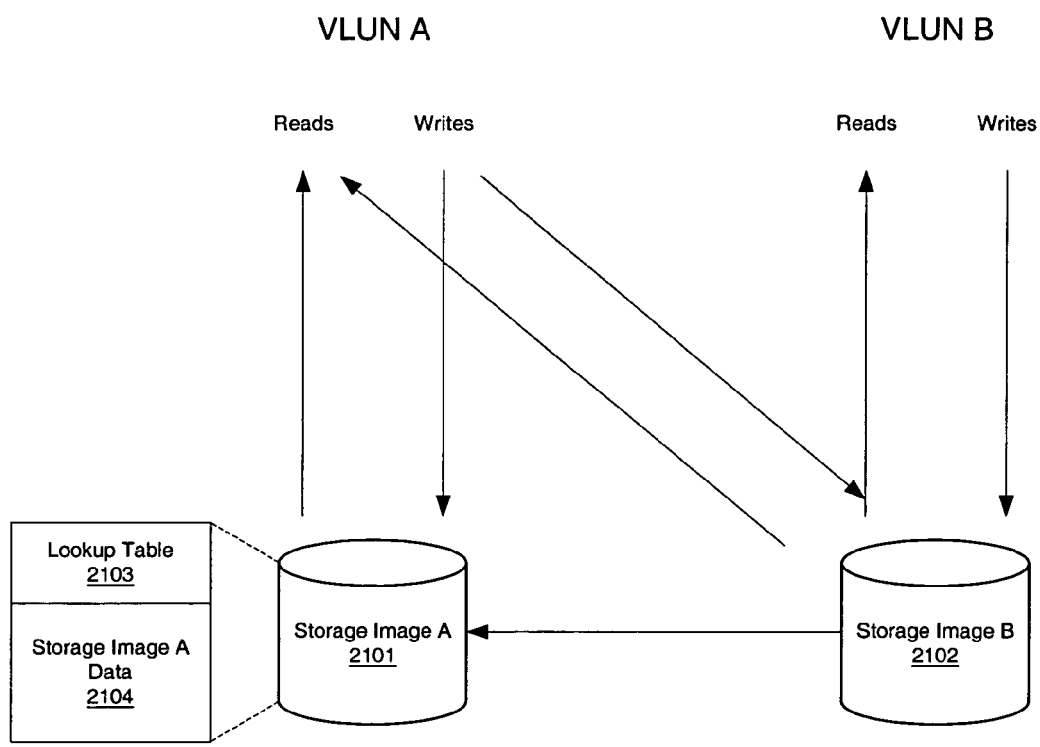
FIG. 21 shows a block diagram of an exemplary one-way data mirror using copy-on-write in accordance with an aspect of the invention.

FIG. 21 shows a block diagram of an exemplary system for performing a one-way data mirror using a copy-on-write implementation in accordance with an aspect of the invention. In one embodiment, the system 2100 includes image A 2101 and image B 2102. The image A 2101 is associated with a lookup table 2103 and its data areas 2104. The image A and image B may be created using a conventional method such as a copy on write snapshot. When a backup request for a VLUN is received, the system makes a copy of the VLUN (e.g., through a snapshot of the VLUN) and creates image A and image B. Instead of storing redundant data in both volumes, this embodiment stores only one copy of the common data in one image, such as image B. In addition, the embodiment stores the difference of the mirrored volume (e.g., difference between image A and image B) in a first volume, such as image A. A lookup table 2103 is associated with the first storage image A to indicate whether there are any differences between the two images. If there is a difference between the two images, the lookup table 2103 may indicate which image contains correct data, such that a read from either volume can retrieve the appropriate data from the images.

In one embodiment, the lookup table 2103 contains a plurality of entries which may be indexed based on the location (e.g., offset) of the corresponding data block. Each of the plurality of entries in the lookup table 2103 may just include a flag indicating which volume contains the latest version of data. Alternatively, each of the plurality of entries in the lookup table 2103 may include a pointer (e.g., address) pointing to the location of the corresponding data block in the respective image. Other information may be included in the lookup table 2103.

When a backup operation is initiated at time 407 of FIG. 4, the image A lookup table 2103 and data areas 2104 are created (based on the original VLUN being backed up). The lookup table 2103 contains information regarding data stored in the data areas 2104 and its corresponding location being stored.

During a write operation to VLUN A, the lookup table 2103 associated with storage image A is checked to determine whether the data block being written to is located in storage image A or storage image B. If the data block to be written is located in the data areas of storage image A, the corresponding entry of the lookup table is deleted and the space of the corresponding data block in storage image A is deallocated. The data is then stored in storage image B and the access from storage image B of the data block retrieves the data from the corresponding data block in storage image B.

During a read operation to VLUN A, the lookup table 2103 is checked to determine whether the data block being read is located in storage image A or storage image B. If the data block to be read is located in the data areas of storage image A, the data is fetched from the corresponding data areas of storage image A. Otherwise (the data block is in image B), the data is fetched from the corresponding data areas of storage image B.

During a write operation to VLUN B, the lookup table 2103 is checked to determine whether there is an entry associated with the data block in the lookup table. If there is no corresponding entry in the lookup table, an entry is created and the existing data (e.g., the old data) in the corresponding data block of the storage image B is copied to the storage image A. Thereafter, the data is written to storage image B.

The system (e.g. the OWM device) may transparently manage all of the storage images internally (see, FIG. 10). In one embodiment, the mechanism for performing the table operations and executing the reads and writes to the data areas of storage image A and storage image B is hidden from the application, operating system, and device drivers (e.g., disk drivers). It may be implemented in a RAID controller or storage controller or virtualization engine. Storage image A and storage image B present a conventional storage interface similar to those represented by conventional VLUNs. As a result, embodiments of the invention do not require significant changes to the existing applications, operating systems, or device drivers which operate on host systems (such as 105 of FIG. 1B).

Figure 22:
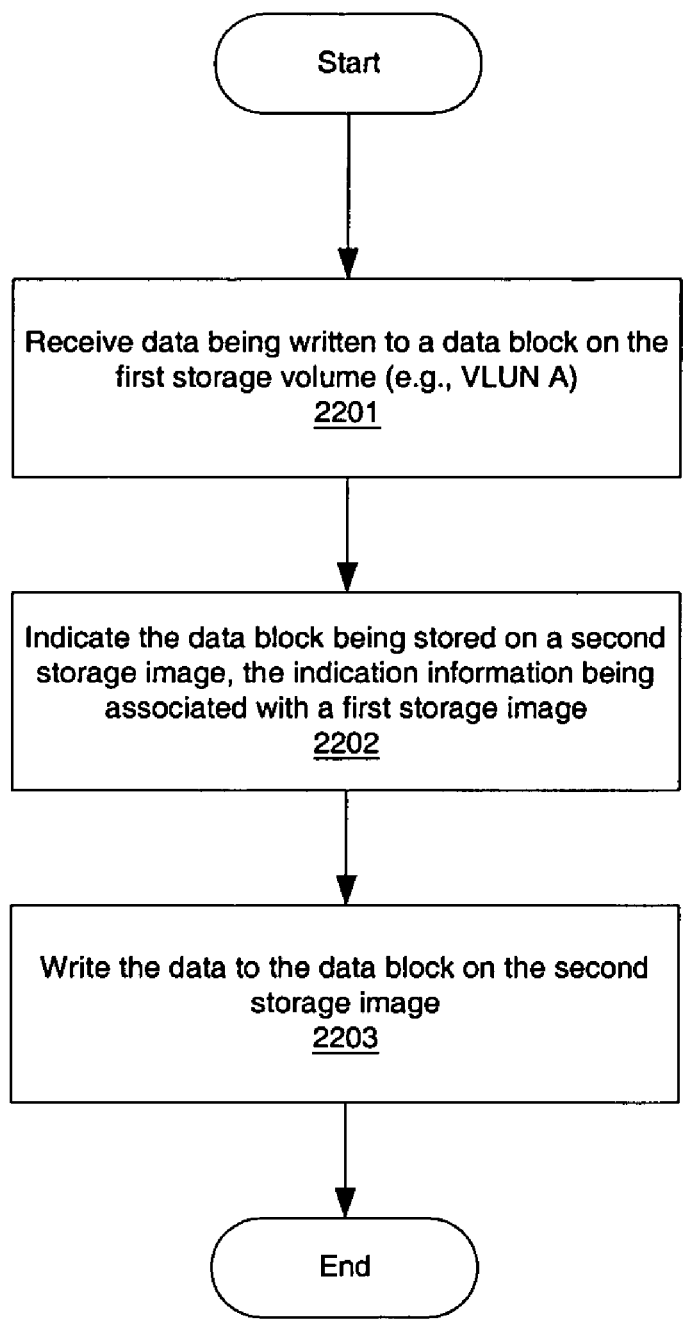
FIG. 22 shows a flowchart illustrating an exemplary one-way data mirror using copy-on-write in accordance with an aspect of the invention.

FIG. 22 shows a flowchart illustrating an exemplary method for performing a write operation of a one-way data mirror using copy-on-write in accordance with an aspect of the invention. In one embodiment, the exemplary method 2200 includes receiving a first data being written to a data block on a first storage volume, indicating the data block being stored on a second storage image, the indication information being associated with a first storage image, and writing the first data to the data block on the second storage image. In an alternative embodiment, the method 2200 further includes receiving a second data being written to the data block on a second storage volume, updating the indication information to indicate the data block is stored on the second storage image, replicating an existing data stored on the data block of the second storage image to the first storage image, and writing the second data to the data block on the second storage image. In a further embodiment, the exemplary method further includes receiving a request to read from a data block on a first storage volume, determining whether the data block is stored on the first storage image or on a second storage image, based on indication information associated with the first storage image, reading the data block from the first storage image if the data block is stored on the first storage image, and reading the data block from the second storage image if the data block is stored on the second storage image.

Referring to FIGS. 21 and 22, at block 2201, when the system receives data to be written to a data block on a first storage volume such as VLUN A, the system indicates the data block is stored in a second storage image such as storage image B at operation 2202, where the indication information is associated with the first storage image (e.g., image A). In one embodiment, such information may be stored in a lookup table, such as lookup table 2103, associated with the first storage image. At block 2203, the system then writes the data to the data block in the second storage image. The indication information indicates that the latest version of data is stored in the second storage image. When a read request is received at the first storage volume, the data can be retrieved from the second storage image based on the information stored in the lookup table associated with the first storage image.

Figure 23:
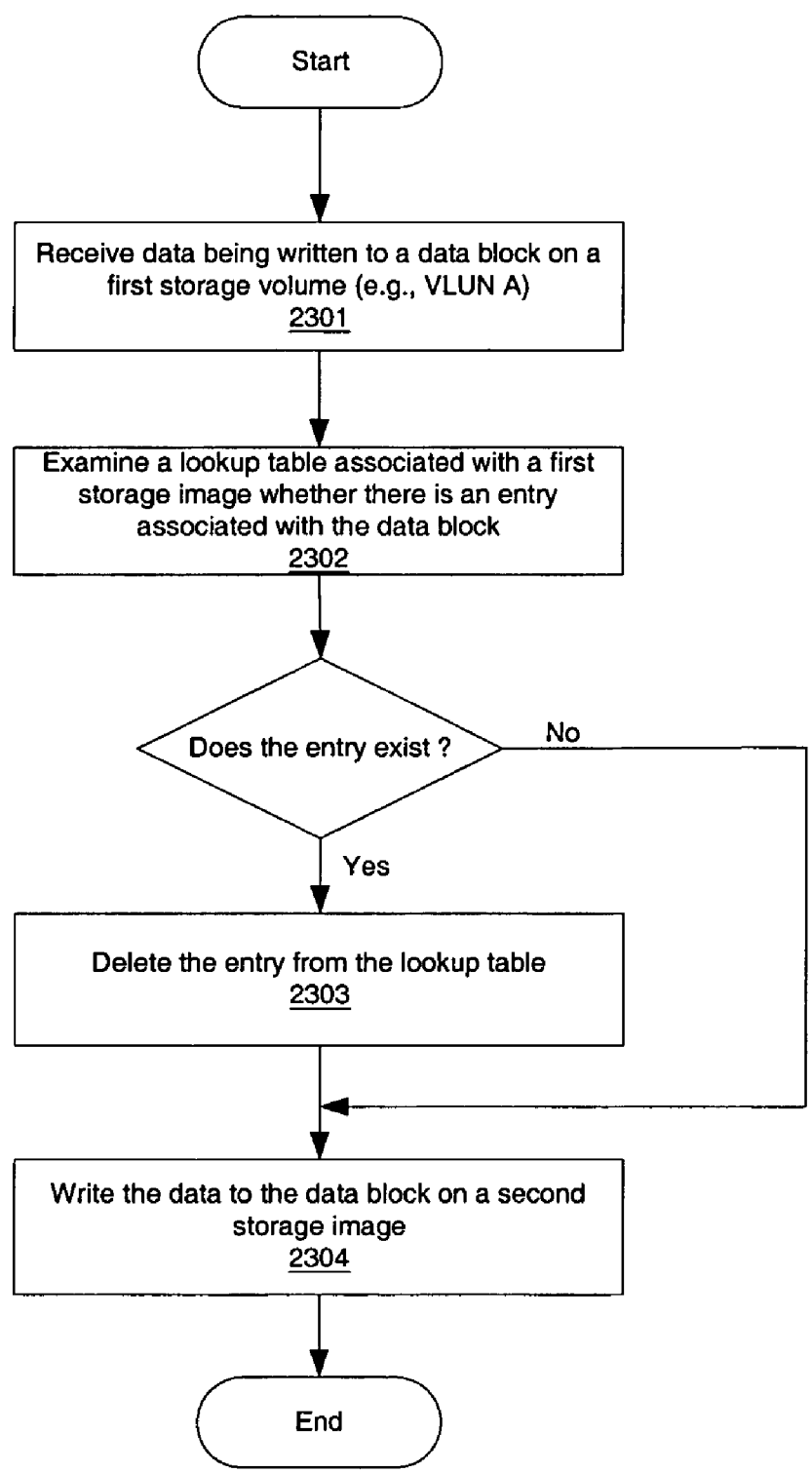
FIG. 23 shows a flowchart illustrating an exemplary one-way data mirror using copy-on-write in accordance with another aspect of the invention.

FIG. 23 shows a flowchart illustrating an exemplary method performing a write operation of a data mirror using copy-on-write in accordance with another aspect of the invention. In one embodiment, at block 2301, a request to write to a data block of a first storage volume (e.g., VLUN A) is received. At block 2302, the system examines a lookup table, such as lookup table 2103 of FIG. 21, associated with a first storage image to determine whether there is an entry associated with the data block being accessed. If the corresponding entry does not exist in the lookup table, then in operation 2304, the data is written to the data block on the second storage image (e.g. image B). If the corresponding entry exists, at block 2303, the system deletes the entry from the lookup table. Thereafter, at block 2304, the data is written to the data block on a second storage image (e.g., image B).

Figure 24:
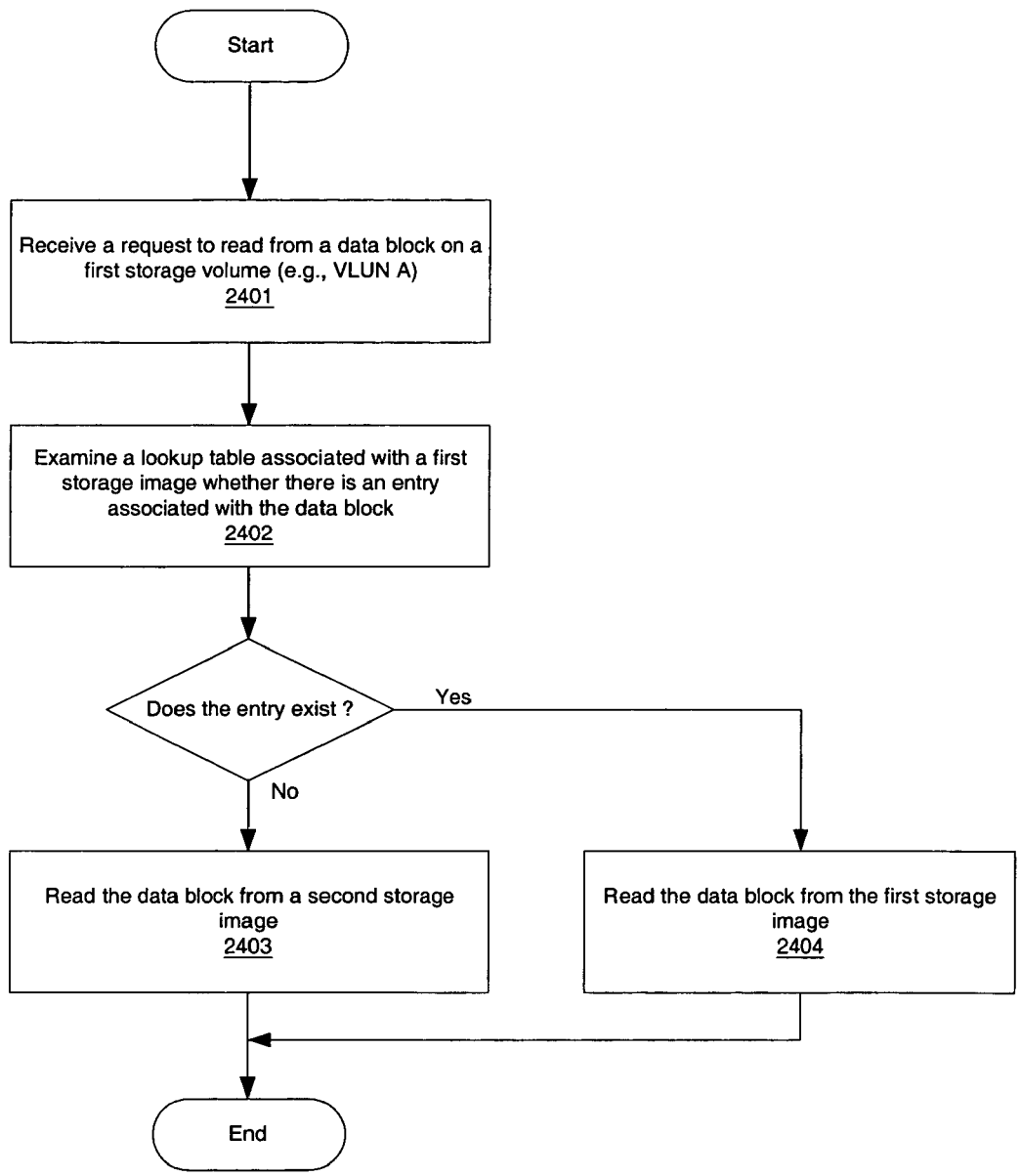
FIG. 24 shows a flowchart illustrating an exemplary one-way data mirror using copy-on-write in accordance with yet another aspect of the invention.

FIG. 24 shows a flowchart illustrating an exemplary method of a read operation in accordance with another aspect of the invention. Referring to FIGS. 21 and 24, according to one embodiment, at block 2401, a request for reading from a data block on a first storage volume (e.g., VLUN A) is received. At block 2402, the system examines a lookup table (e.g., lookup table 2103) associated with a first storage image to determine whether there is an entry associated with the data block. If there is an entry corresponding to the data block, at block 2404, the data is then read from the data block of the first storage image (e.g., image A). Otherwise, at block 2403, the data is read from the data block of a second storage image (e.g., image B).

Figure 25:
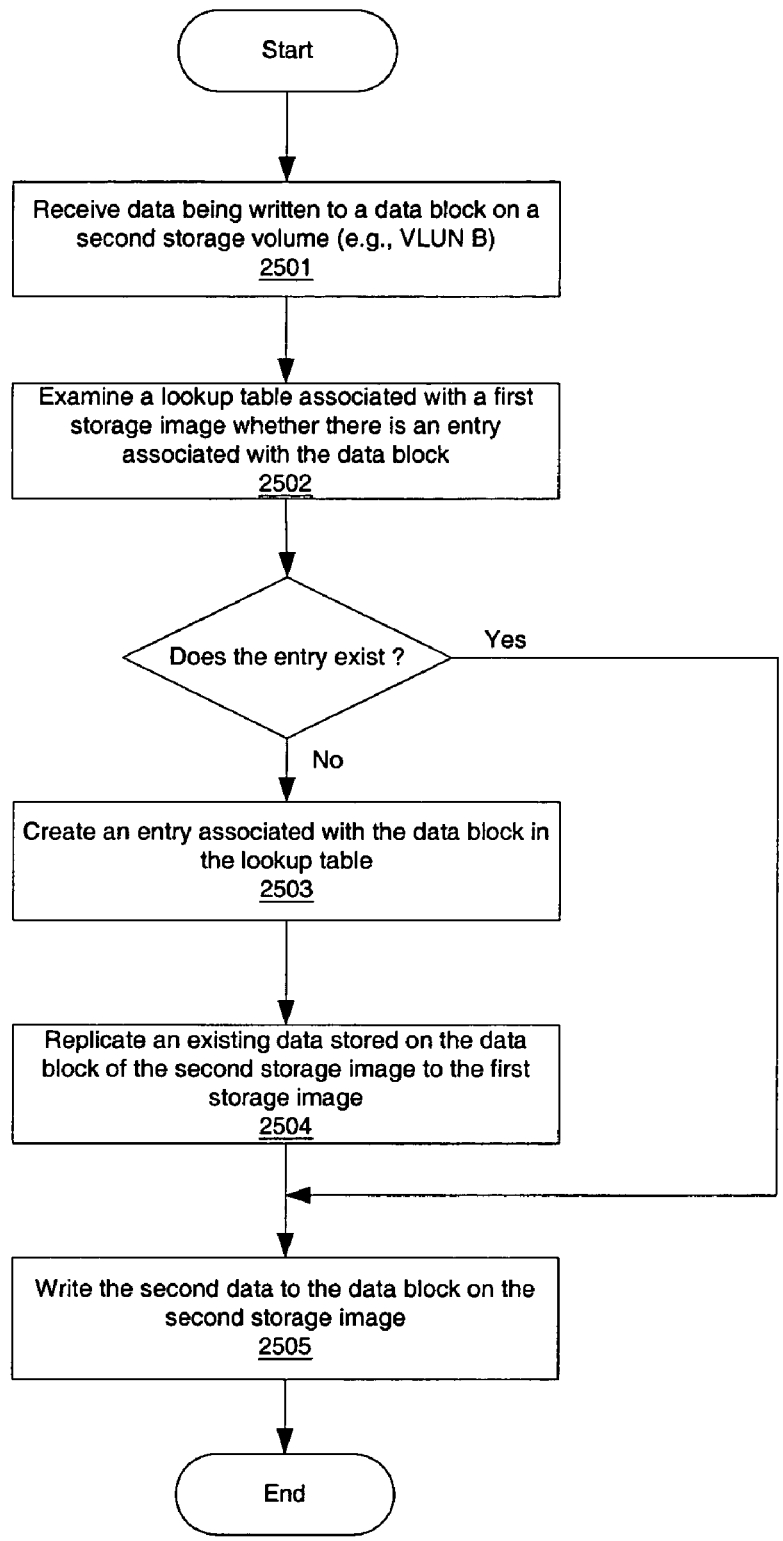
FIG. 25 shows a flowchart illustrating an exemplary one-way data mirror using copy-on-write in accordance with yet another aspect of the invention.

FIG. 25 shows a flowchart illustrating an exemplary method of a write operation using copy-on-write in accordance with another aspect of the invention. Referring to FIGS. 21 and 25, according to one embodiment, at block 2501, a request to write to a data block of a second storage volume (e.g., VLUN B) is received. At block 2502, the system examines a lookup table, such as lookup table 2103, associated with a first storage image (e.g., image A) to determine whether there is an entry, in the lookup table, associated with the data block being accessed. If the entry does exist, the system writes, in operation 2505, the data to the data block on the second storage image. If the corresponding entry does not exist, at block 2503, the system creates an entry in the lookup table to indicate the corresponding data block is located on a second storage image (e.g., image B). At block 2504, the system then replicates an existing data stored at the corresponding data block of the second storage image to the first storage image. Thereafter, at block 2505, the data is written to the data block on the second storage image.

As discussed above, in order to ensure that data written to the one-way mirrored storage volumes (e.g., VLUN A and VLUN B) is not corrupted during the potentially simultaneous accesses, in one embodiment, two groups of data locks may be provided. The first group contains those required by the operations discussed above to ensure proper and orderly access to the VLUNs. These locks are maintained independently from the storage volume being backed up and are not part of the data to be backed up. The second group of locks may contain those common and relevant locking mechanisms for VLUNs (virtualized storage in the form of virtual LUNs). For example, if the VLUN is a RAID-5 compatible storage volume, stripe locks may be utilized for reads and writes, to prevent one process from writing to a data area while another process is reading from the same area. It would be appreciated that other lock mechanisms may be apparent to an ordinary person skilled in the art to use with embodiments of the invention.

Figure 26:
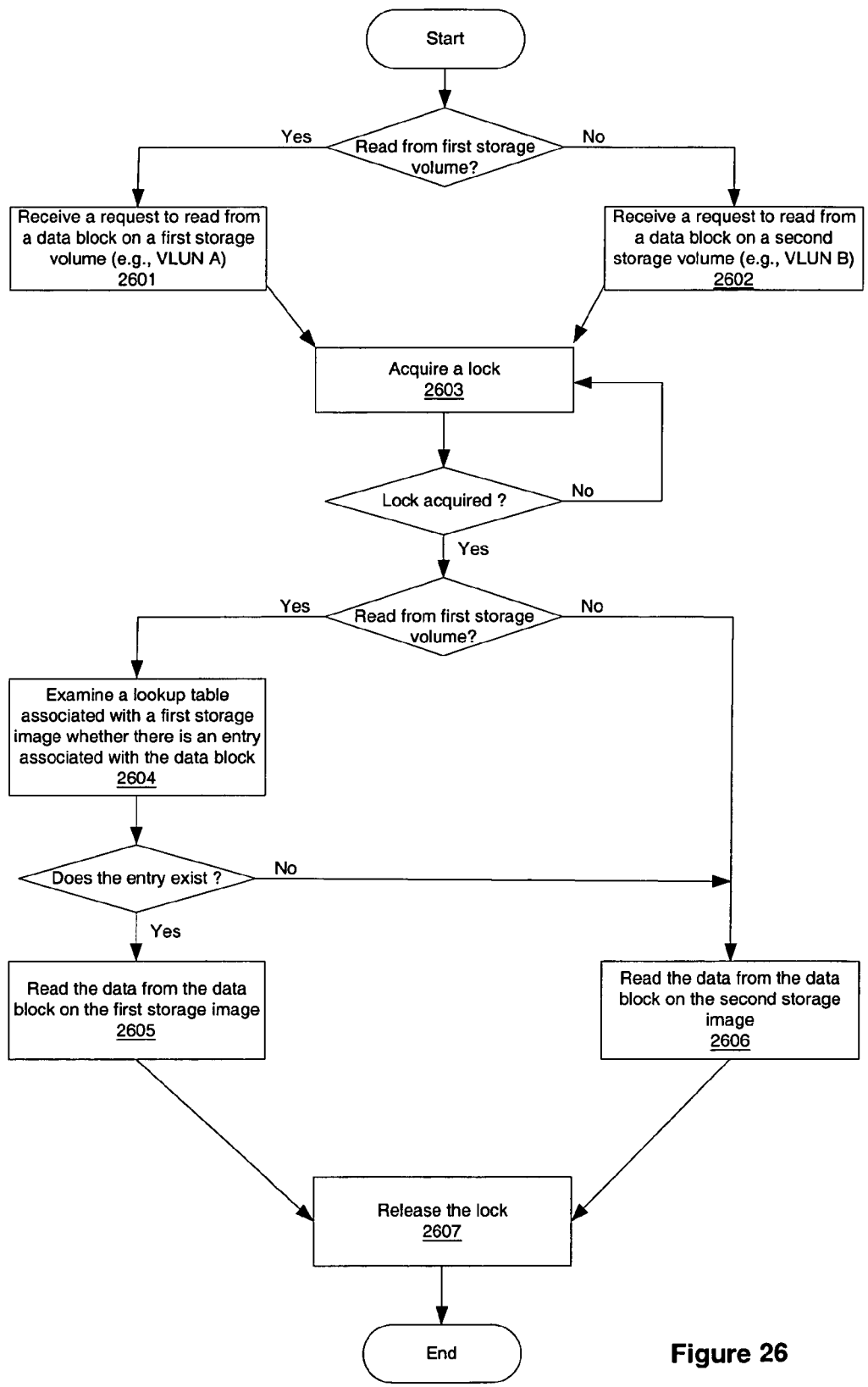
FIG. 26 shows a flowchart illustrating an exemplary one-way data mirror using copy-on-write in accordance with yet another aspect of the invention.

FIG. 26 shows a flowchart illustrating an exemplary read operation, with locks, in accordance with a copy-on-write implementation of one aspect of the invention. Referring to FIG. 26, according to one embodiment, at block 2601, a request to read from a data block of a first storage volume (e.g., VLUN A) is received. At block 2603, the system tries to acquire a lock to prevent other processes from accessing the same volume. If the lock is not available, the current process is suspended until the lock is available. Once the lock is acquired, at block 2604, the system examines a lookup table associated with a first storage image (e.g., storage image A) to determine whether there is an entry corresponding to the data block. If there is an entry corresponding to the data block in the lookup table, at block 2605, the system reads the data from the first storage image. Otherwise, at block 2606, the system reads the data from a second storage image (e.g., storage image B). Thereafter, at block 2607, the acquired lock is released after the respective transaction.

Meanwhile, at block 2602, a request to read data from a data block of a second storage volume (e.g., VLUN B) is received. Similarly, the system tries to acquire a lock to prevent other processes from accessing the same area. If the lock is not available, the current process is suspended until the lock is available. Once the lock is acquired, at block 2606, the system reads the data from the second storage image (e.g., storage image B). Thereafter, at block 2607, the acquired lock is released after the respective transaction.

Figure 27:
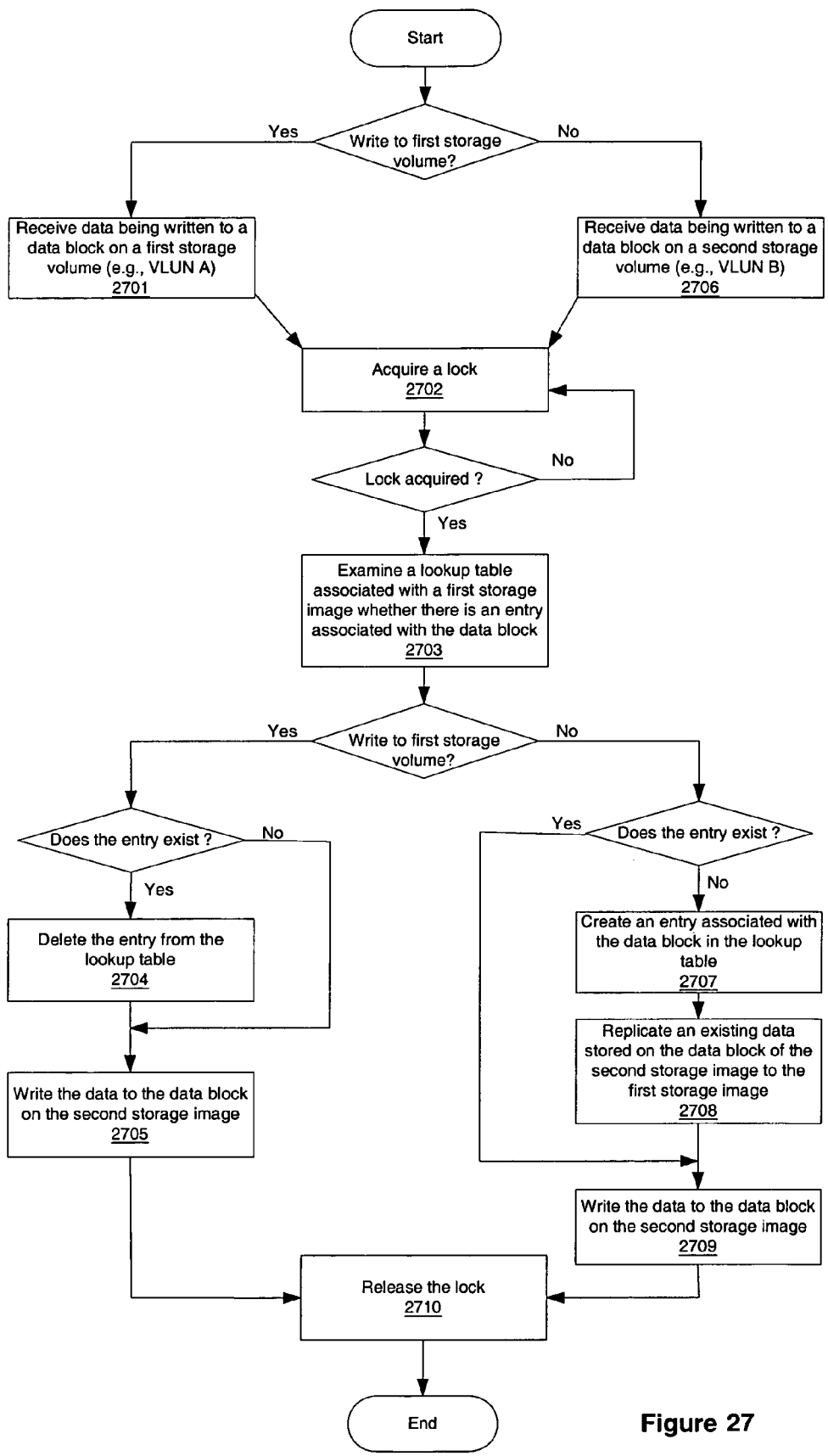
FIG. 27 shows a flowchart illustrating an exemplary one-way data mirror using copy-on-write in accordance with yet another aspect of the invention.

FIG. 27 shows a flowchart illustrating an exemplary method for performing a write operation of a one-way data mirror using copy-on-write in accordance with yet another aspect of the invention. Referring to FIGS. 21 and 27, at block 2701, data is received to be written to a data block on the first storage volume (e.g., VLUN A). In order to ensure that no other process attempts to access the same data area, at block 2702, the system acquires a lock. In addition, if the VLUN being accessed is a RAID-5 compatible storage volume, there may be an additional stripe lock mechanism (not shown) used to prevent the parity from becoming corrupted, which is not pertinent to the embodiments of the present application. If the lock is not acquired (e.g., the lock is being used by another process), the request is suspended until the lock is acquired successfully. Once the lock is acquired, at block 2703, the system examines a lookup table associated with a first storage image, such as lookup table 2103 associated with image A, to determine whether there is an entry associated with the data block being accessed. If there is no entry in the table, then in operation 2705, the data is written to the data block on the second storage image and the lock is released in operation 2710. If there is an entry associated with the data block, at block 2704, the system deletes the entry from the lookup table to indicate the data block is located at the second storage image. Thereafter, at block 2705, the data is written to the data block on the second storage image (e.g., image B) and the lock acquired is released at block 2710 after the transaction finishes.

Meanwhile, a second data is received to be written to the second storage volume (e.g., VLUN B) at block 2706. Similarly, the system tries to acquire the lock at block 2702. If the lock has been acquired by another process, this process will wait until the lock is available. Once the lock is acquired, at block 2703, the system examines a lookup table associated with the first storage image, such as lookup table 2103 associated with image A, to determine whether there is an entry associated with the data block being accessed. If there is no entry associated with the data block, at block 2707, the system creates an entry in the lookup table to indicate the data block is located at the second storage image. At block 2708, the system replicates an existing data stored on the corresponding data block of the second storage image (e.g., image B) to the first storage image (e.g., image A). Thereafter, at block 2709, the data is written to the data block on the second storage image (e.g., image B) and the lock acquired is released at block 2710 after the transaction finishes.

FIG. 1A illustrates an exemplary data storage system which may be used with one embodiment of the present invention. Referring to FIG. 1A, a data storage system 100A contains a disk array composed of one or more sets of storage devices (e.g. RAID drives) such as disks 115–119 that may be magnetic or optical storage media or any other fixed-block storage media, such as memory cells. Data in disks 115–119 is stored in blocks (e.g., data blocks of 512-bytes in lengths). Various embodiments of the invention may also be used with data storage devices which are not fixed block storage media.

Data storage system 100A also contains an array controller 120 that controls the operation of the disk array. Array controller 120 provides the capability for data storage system 100A to perform tasks and execute software programs stored within the data storage system. Array controller 120 includes one or more processors 124, memory 122 and non-volatile storage 126 (e.g., non-volatile random access memory (NVRAM), flash memory, etc.). Memory 122 may be random access memory (e.g. DRAM) or some other machine-readable medium, for storing program code (e.g., software for performing any method of the present invention) that may be executed by processor 124. Non-volatile storage 126 is a durable data storage area in which data remains valid during intentional and unintentional shutdowns of data storage system 100A. The nonvolatile storage 126 may be used to store programs (e.g. "firmware") which are executed by processor 124. The processor 124 controls the operation of controller 120 based on these programs. The processor 124 uses memory 122 to store data and optionally software instructions during the operation of processor 124. The processor 124 is coupled to the memory 122 and storage 126 through a bus within the controller 120. The bus may include a switch which routes commands and data among the components in the controller 120. The controller 120 also includes a host interface 123 and a storage interface 125, both of which are coupled to the bus of controller 120. The storage interface 125 couples the controller 120 to the disk array and allows data and commands and status to be exchanged between the controller 120 and the storage devices in the array. For example, when a write operation is to be performed, the controller 120 causes commands (e.g. a write command) to be transmitted through the storage interface 125 to one or more storage devices and causes data to be written/stored on the storage devices to be transmitted through the storage interface 125. Numerous possible interconnection interfaces may be used to interconnect the controller 120 to the disk array; for example, the interconnection interface may be a fibre channel interface, a parallel bus interface, a SCSI bus, a USB bus, an IEEE 1394 interface, etc. The host interface 123 couples the controller 120 to another system (e.g. a general purpose computer or a storage router or a storage switch or a storage virtualization controller) which transmits data to and receives data from the storage array (e.g. disks 115–119). This other system may be coupled directly to the controller 120 (e.g. the other system may be a general purpose computer coupled directly to the controller 120 through a SCSI bus or through a fibre channel interconnection) or may be coupled through a network (e.g. an EtherNet Network or a fibre channel interconnection).

Figure 1B:
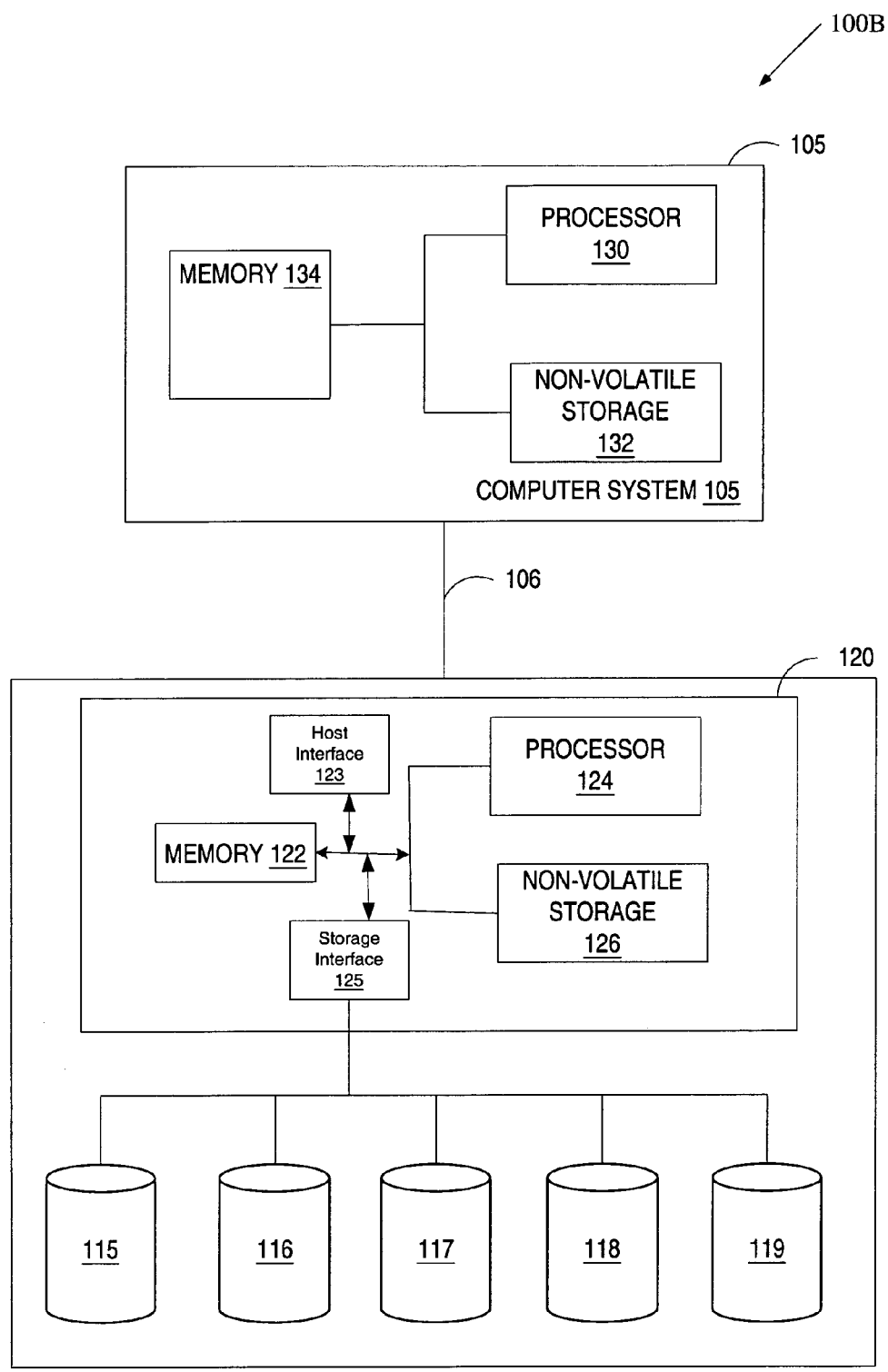
FIG. 1B shows a block diagram illustrating an exemplary system which may be used with another aspect of the invention.

FIG. 1B illustrates an exemplary data storage system 100B according to an embodiment of the invention. The controller 120 and disks 115–119 of FIG. 1A are part of the system 100B. Computer system 105 may be a server, a host or any other device external to controller 120 and is coupled to controller 120. Users of data storage system 100B may be connected to computer system 105 directly or via a network such as a local area network or a wide area network or a storage array network. Controller 120 communicates with computer system 105 via a bus 106 that may be a standard bus for communicating information and signals and may implement a block-based protocol (e.g., SCSI or fibre channel). Array controller 120 is capable of responding to commands from computer system 105.

In one embodiment, computer 105 includes non-volatile storage 132 (e.g., NVRAM, flash memory, or other machine-readable media etc.) that stores variety of information including version information associated with data blocks of disks 115–119. In one embodiment, memory 134 stores computer program code that can be executed by processor 130. Memory 134 may be DRAM or some other machine-readable medium.

Figure 2:
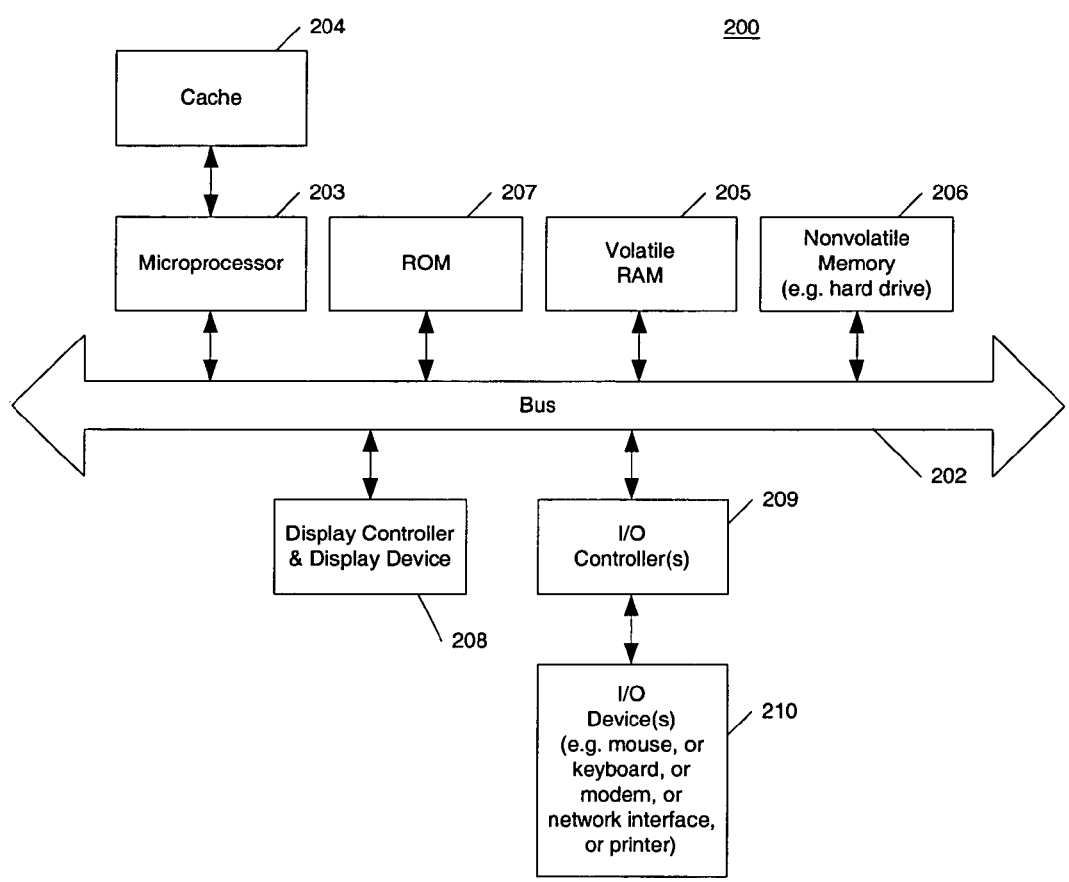
FIG. 2 shows a block diagram of a computer system which may be used with an embodiment of the invention.

FIG. 2 shows one example of a typical computer system, which may be used with the present invention, such as computer system 105 of FIG. 1B. Note that while FIG. 2 illustrates various components of a computer system, it is not intended to represent any particular architecture or manner of interconnecting the components as such details are not germane to the present invention. It will also be appreciated that network computers and other data processing systems, which have fewer components or perhaps more components, may also be used with the present invention. The computer system of FIG. 2 may, for example, be a workstation from Sun Microsystems or a computer running a windows operating system or an Apple Macintosh computer or a personal digital assistant (PDA).

As shown in FIG. 2, the computer system 200, which is a form of a data processing system, includes a bus 202 which is coupled to a microprocessor 203 and a ROM 207 and volatile RAM 205 and a non-volatile memory 206. The microprocessor 203, which may be a G3 or G4 microprocessor from Motorola, Inc. is coupled to cache memory 204 as shown in the example of FIG. 2. Alternatively, the microprocessor 203 may be an UltraSPARC microprocessor from Sun Microsystems, Inc. Other processors from other vendors may be utilized. The bus 202 interconnects these various components together and also interconnects these components 203, 207, 205, and 206 to a display controller and display device 208 and to peripheral devices such as input/output (I/O) devices which may be mice, keyboards, modems, network interfaces (e.g. an EtherNet interface), printers and other devices which are well known in the art. Typically, the input/output devices 210 are coupled to the system through input/output controllers 209. The volatile RAM 205 is typically implemented as dynamic RAM (DRAM) which requires power continually in order to refresh or maintain the data in the memory. The non-volatile memory 206 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers and/or adapters as are well known in the art. In one embodiment the I/O controller 209 includes a USB (Universal Serial Bus) adapter for controlling USB peripherals and an EtherNet interface adapter for coupling the system 105 to a network.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   receiving a first data being directed to a first storage volume;
   receiving a second data being directed to a second storage volume;
   writing the first data, as part of a first I/O (input/output) process which begins before a selected time, to a first storage image and a second storage image, the first storage image and the second storage image forming a data mirror prior to the selected time, wherein writes to one image are replicated to the other image; and
   writing the second data, as part of a second I/O process which begins after the selected time, to the second storage image but not to the first storage image, the second I/O process running while the first process runs.

2. The method of claim 1, further comprising replicating data stored on the first storage image to the second storage image, before selected time.

3. The method of claim 2, wherein the selected time is determined relative to a command to preserve data in a data storage system.

4. The method of claim 1, further comprising writing a third data, as part of a third I/O process which begins after the selected time, to the first storage image and to the second storage image, the third data being addressed to the first storage volume.

5. The method of claim 1, further comprising performing a backup operation using the first storage image after the selected time.

6. The method of claim 1, further comprising preventing other requests to access identical areas of the first and the second storage images during the writing of the first data.

7. The method of claim 6, wherein the preventing comprises:
acquiring a lock of a lock mechanism before the writing; and
releasing the lock of the lock mechanism after the writing is completed.

8. The method of claim 7, wherein the lock mechanism is maintained separately and independently from the first and second storage images.

9. The method of claim 7, wherein if the lock is not available, the method further comprises suspending the writing until the lock is available.

10. The method of claim 1, wherein the writing of the first data further comprises simultaneously writing the first data to a third storage image.

11. The method of claim 1, wherein the second I/O process is capable of accessing the same data, via the second storage image, as the first I/O process.

12. A machine-readable medium having executable code to cause a machine to perform a method, the method comprising:
receiving a first data being directed to a first storage volume;
receiving a second data being directed to a second storage volume;
writing the first data, as part of a first I/O (input/output) process which begins before a selected time, to a first storage image and a second storage image, the first storage image and the second storage image forming a data mirror prior to the selected time, wherein writes to one image are replicated to the other image; and
writing the second data, as part of a second I/O process which begins after the selected time, to the second storage image but not to the first storage image, the second I/O process running while the first process runs.

13. The machine-readable medium of claim 12, wherein the method further comprises replicating data stored on the first storage image to the second storage image, before selected time.

14. The machine-readable medium of claim 13, wherein the selected time is determined relative to a command to preserve data in a data storage system.

15. The machine-readable medium of claim 12, wherein the method further comprises writing a third data, as part of a third I/O process which begins after the selected time, to the first storage image and to the second storage image, the third data being addressed to the first storage volume.

16. The machine-readable medium of claim 12, wherein the method further comprises performing a backup operation using the first storage image after the selected time.

17. The machine-readable medium of claim 12, wherein the method further comprises preventing other requests to access identical areas of the first and the second storage images during the writing of the first data.

18. The machine-readable medium of claim 17, wherein the preventing comprises:
acquiring a lock of a lock mechanism before the writing; and
releasing the lock of the lock mechanism after the writing is completed.

19. The machine-readable medium of claim 18, wherein the lock mechanism is maintained separately and independently from the first and second storage images.

20. The machine-readable medium of claim 18, wherein if the lock is not available, the method further comprises suspending the writing until the lock is available.

21. The machine-readable medium of claim 12, wherein the writing of the first data further comprises simultaneously writing the first data to a third storage image.

22. The machine-readable medium of claim 12, wherein the second I/O process is capable of accessing the same data, via the second storage image, as the first I/O process.

23. An apparatus, comprising:
means for receiving a first data being directed to a first storage volume;
means for receiving a second data being directed to a second storage volume;
means for writing the first data, as part of a first I/O (input/output) process which begins before a selected time, to a first storage image and a second storage image, the first storage image and the second storage image forming a data mirror prior to the selected time, wherein writes to one image are replicated to the other image; and
means for writing the second data, as part of a second I/O process which begins after the selected time, to the second storage image but not to the first storage image, the second I/O process running while the first process runs.

24. The apparatus of claim 23, further comprising means for replicating data stored on the first storage image to the second storage image, before selected time.

25. The apparatus of claim 24, wherein the selected time is determined relative to a command to preserve data in a data storage system.

26. The apparatus of claim 23, further comprising means for writing a third data, as part of a third I/O process which begins after the selected time, to the first storage image and to the second storage image, the third data being addressed to the first storage volume.

27. The apparatus of claim 23, further comprising means for performing a backup operation using the first storage image after the selected time.

28. The apparatus of claim 23, further comprising means for preventing other requests to access identical areas of the first and the second storage images during the writing of the first data.

29. The apparatus of claim 28, wherein the means for preventing comprises:
means for acquiring a lock of a lock mechanism before the writing; and
means for releasing the lock of the lock mechanism after the writing is completed.

30. The apparatus of claim 29, wherein the lock mechanism is maintained separately and independently from the first and second storage images.

31. The apparatus of claim 29, wherein if the lock is not available, the method further comprises suspending the writing until the lock is available.

32. The apparatus of claim 23, wherein the writing of the first data further comprises simultaneously writing the first data to a third storage image.

33. A data storage system, comprising:
a processing system; and a memory coupled to the processing system, the memory storing instructions, which when executed by the processing system, cause the processing system to perform the operations of:

receiving a first data being directed to a first storage volume;

receiving a second data being directed to a second storage volume;

writing the first data, as part of a first I/O (input/output) process which begins before a selected time, to a first storage image and a second storage image, the first storage image and the second storage image forming a data mirror prior to the selected time, wherein writes to one image are replicated to the other image; and writing the second data, as part of a second I/O process which begins after the selected time, to the second storage image but not to the first storage image, the second I/O process running while the first process runs.

34. The apparatus of claim 23, wherein the second I/O process is capable of accessing the same data, via the second storage image, as the first I/O process.

* * * * *